(12) United States Patent
Takemori et al.

(10) Patent No.: US 11,212,080 B2
(45) Date of Patent: Dec. 28, 2021

(54) COMMUNICATION SYSTEM, VEHICLE, SERVER DEVICE, COMMUNICATION METHOD, AND COMPUTER PROGRAM

(71) Applicant: KDDI CORPORATION, Tokyo (JP)

(72) Inventors: Keisuke Takemori, Tokyo (JP); Seiichiro Mizoguchi, Tokyo (JP); Ayumu Kubota, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 379 days.

(21) Appl. No.: 16/315,031

(22) PCT Filed: Jul. 26, 2017

(86) PCT No.: PCT/JP2017/027040
§ 371 (c)(1),
(2) Date: Jan. 3, 2019

(87) PCT Pub. No.: WO2018/092356
PCT Pub. Date: May 24, 2018

(65) Prior Publication Data
US 2019/0238325 A1    Aug. 1, 2019

(30) Foreign Application Priority Data
Nov. 18, 2016 (JP) .............................. JP2016-224669

(51) Int. Cl.
*H04L 29/06* (2006.01)
*H04L 9/08* (2006.01)
(Continued)

(52) U.S. Cl.
CPC ............ *H04L 9/0819* (2013.01); *G06F 21/44* (2013.01); *G09C 1/00* (2013.01); *H04L 9/08* (2013.01);
(Continued)

(58) Field of Classification Search
CPC ....... H04L 9/0819; H04L 9/08; H04L 9/0894; H04L 9/14; H04L 9/32; H04L 9/321; G06F 21/44; G09C 1/00; B60R 16/0231
See application file for complete search history.

(56) References Cited

U.S. PATENT DOCUMENTS 7,106,861 B1    9/2006    Nishimura et al.
8,209,535 B2    6/2012    Lee et al.
(Continued)

FOREIGN PATENT DOCUMENTS

CN    101292558 A    10/2008
CN    102833075 A    12/2012
(Continued)

OTHER PUBLICATIONS

K. Takemori "In-Vehicle Network Security Using Secure Elements-Discussion of Security Technologies-", IEICE, IEICE Technical Report, vol. 114, No. 508, along with an English Abstract, Mar. 2015, pp. 73-78
(Continued)

*Primary Examiner* — Ghodrat Jamshidi
(74) *Attorney, Agent, or Firm* — Greenblum & Bernstein, P.L.C.

(57) ABSTRACT

A communication system is provided that allows communication between a vehicle and a server device. This communication system includes: the server device; a first arithmetic processing device installed in the vehicle; and a second arithmetic processing device that is a secure element and is installed in the vehicle. The second arithmetic processing device includes: a vehicle key storage unit that stores a first key and a second key; a vehicle authentication processing unit that performs authentication with the server device using the first key; and a vehicle key transmission/reception unit that transmits or receives a third key to or from the server device by encryption communication which
(Continued)

uses the second key. The first arithmetic processing device includes a vehicle communication unit that performs encryption communication with the server device using the third key.

16 Claims, 8 Drawing Sheets

(51) Int. Cl.
*H04L 9/14* (2006.01)
*H04L 9/32* (2006.01)
*G09C 1/00* (2006.01)
*G06F 21/44* (2013.01)
*B60R 16/023* (2006.01)

(52) U.S. Cl.
CPC .............. *H04L 9/0894* (2013.01); *H04L 9/14* (2013.01); *H04L 9/32* (2013.01); *H04L 9/321* (2013.01); *B60R 16/0231* (2013.01)

(56) References Cited

U.S. PATENT DOCUMENTS

| | | | |
|---|---|---|---|
| 9,132,790 | B2 | 9/2015 | Miyake |
| 9,439,067 | B2 | 9/2016 | Cherian et al. |
| 9,555,771 | B2* | 1/2017 | Oohara ............... B60R 25/24 |
| 2003/0147534 | A1 | 8/2003 | Ablay et al. |
| 2004/0083374 | A1* | 4/2004 | Sugawara .......... G07C 9/00309 713/189 |
| 2008/0313462 | A1 | 12/2008 | Zhao et al. |
| 2011/0320089 | A1 | 12/2011 | Lewis |
| 2013/0160086 | A1* | 6/2013 | Katar ................... H04L 63/08 726/4 |
| 2013/0173112 | A1* | 7/2013 | Takahashi ............ H04W 12/04 701/36 |
| 2013/0230173 | A1* | 9/2013 | Hori .................... H04L 9/0891 380/281 |
| 2015/0003613 | A1* | 1/2015 | Kawamura ............ B60R 25/24 380/278 |
| 2015/0180840 | A1* | 6/2015 | Jung ..................... H04L 67/34 713/150 |
| 2015/0256537 | A1* | 9/2015 | Chew .................. H04W 12/069 726/7 |
| 2016/0127903 | A1 | 5/2016 | Lee et al. |
| 2016/0315937 | A1* | 10/2016 | Al-Kadi ............. H04L 63/0435 |
| 2017/0111347 | A1* | 4/2017 | Kim .................... G06Q 50/06 |
| 2017/0200324 | A1* | 7/2017 | Chennakeshu ... H04L 12/40104 |
| 2017/0244565 | A1* | 8/2017 | Bronk .................. H04L 63/126 |
| 2018/0076958 | A1* | 3/2018 | Narimoto ............. H04L 9/0877 |

FOREIGN PATENT DOCUMENTS

| | | |
|---|---|---|
| CN | 104724057 A | 6/2015 |
| CN | 105827586 A | 8/2016 |
| JP | 2000-059323 A | 2/2000 |
| JP | 2003-249932 A | 9/2003 |
| JP | 2005-244379 A | 9/2005 |
| JP | 2006-121510 A | 5/2006 |
| JP | 2014-526999 A | 10/2014 |
| JP | 2015-103183 A | 6/2015 |
| JP | 2016-072675 A | 5/2016 |
| WO | 2007/046630 A2 | 4/2007 |
| WO | 2013/005730 A1 | 1/2013 |
| WO | 2013/037996 A1 | 3/2013 |
| WO | 2016/093368 A1 | 6/2016 |

OTHER PUBLICATIONS

"Japanese Industrial Standards", JIS D 4901, Vehicle Identification Number (VIN), along with an English translation , Oct. 15, 1982.
STMicroelectronics, AN4240 Application note, "Introduction to the Cryptographic Service Engine (CSE) module for SPC56ECxx and SPC564BXX devices" Internet URL: http://www.st.com/web/en/resource/technical/document/application_note/DM00075575.pdf, Sep. 2013.
H. Kawabata et al., "A Key Management Framework for Automotive ECUs", SCIS2016 [USB], 2F4-5, Jan. 22, 2016, pp. 1-7
International Search Report issued in International Bureau of WIPO Patent Application No. PCT/JP2017/027040, datsd Oct. 17, 2017, along with an English translation thereof.
Notice or Reasons for Rejection issued in Japan family member Patent Appl. No. 2016-224669, dated May 30, 2017, along with an English translation thereof.
Decision of Rejection issued in Japan family member Patent Appl. No. 2016-224669, dated Sep. 5, 2017, along with an English translation thereof.
Search Report issued in European Patent Office (EPO) Patent Application No. 17872635.2, dated Feb. 21, 2020.
The First Office Action (including English Language Translation), by the China National Intellectual Property Administration, dated Jun. 21, 2021, in Chinese Application No. 201780042182.0.
Office Action (in English Language), by the European Patent Office, dated Aug. 27, 2021, in European Application No. 17872635.2.
Hongxia Jin et al., "A technique for self-certifying tamper resistant software", Quality of Protection, ACM, 2 Penn Plaza, Suite 701 New York, NY 10121-0701 USA, Oct. 29, 2007 (Oct. 29, 2007), pp. 12-14, XP058098466, DOI: 10.1145/1314257.1314262, ISBN: 978-1-59593-885-5.
G. P. Saggese et al., "A tamper resistant hardware accelerator for RSA cryptographic applications", Journal of Systems Architecture, Elsevier BV, NL, vol. 50, No. 12, Dec. 1, 2004 (Dec. 1, 2004), pp. 711-727, XP004650742, ISSN: 1383-7621.
Lei Xie et al., "A Tamper-resistance Key Pre-distribution Scheme for Wireless Sensor Networks", Proceedings of the Fifth International Conference on Grid and Cooperative Computing Workshops, 2006, GCCW '06, IEEE, PI, Oct. 1, 2006 (Oct. 1, 2006), pp. 437-443, XP031031165, ISBN: 978-0-7695-2695-9.
Notice of Allowance issued in JAPAN family member Patent Appl. No. 2017-233795, dated May 28, 2019, along with an English translation thereof.
Office Action issued in INDIAN Counterpart Patent Appl. No. 201917000448, dated Nov. 16, 2020.

* cited by examiner

COMMUNICATION SYSTEM, VEHICLE, SERVER DEVICE, COMMUNICATION METHOD, AND COMPUTER PROGRAM

TECHNICAL FIELD

The present invention relates to a communication system, a vehicle, a server device, a communication method, and a computer program.

This application claims priority to and the benefit of Japanese Patent Application No. 2016-224669, filed on Nov. 18, 2016, the contents of which are hereby incorporated by reference into the present application.

BACKGROUND ART

Conventionally, automobiles have an electronic control unit (ECU), and implements a function such as engine control through the ECU. The ECU is a type of computer and implements a desired function through a computer program. For example, security technology for an in-vehicle control system configured by connecting a plurality of ECUs to a controller area network (CAN) is described in Non-Patent Document 1.

CITATION LIST

Non-Patent Literature

[Non-Patent Literature 1]
Keisuke TAKEMORI, "In-vehicle Network Security Using Secure Elements: Discussion of Security Technologies", Institute of Electronics, Information and Communication Engineers, Technical Report, vol. 114, no. 508, pp. 73-78, March 2015

[Non-Patent Literature 2]
Japanese Industrial Standards, JISD 4901, "Vehicle Identification Number (VIN)"

[Non-Patent Literature 3]
STMicroelectronics, "AN4240 Application note," retrieved on Nov. 8, 2016, Internet <URL: http://www.st.com/web/en/resource/technical/document/application_note/DM00075575.p df>

SUMMARY OF INVENTION

Problem to be Solved by the Invention

Improving security when an automobile calls a connected car, for example, performs communication with an external server device, has been an issue.

The present invention has been made in view of such a problem and an object thereof is to provide a communication system, a vehicle, a server device, a communication method, and a computer program capable of improving security when a vehicle such as an automobile performs communication with an external server device.

Means for Solving the Problem (1) An embodiment of the present invention provides a communication system that performs communication between a vehicle and a server device, including: the server device; a first arithmetic processing device installed in the vehicle; and a second arithmetic processing device which is a secure element installed in the vehicle, wherein the second arithmetic processing device includes: a vehicle key storage unit configured to store a first key and a second key used for communication between the vehicle and the server device; a vehicle authentication processing unit configured to perform an authentication process with the server device using the first key; and a vehicle key transmission/reception unit configured to transmit or receive a third key to or from the server device by encryption communication which uses the second key, wherein the first arithmetic processing device includes a vehicle communication unit configured to perform encryption communication with the server device using the third key, and the server device includes: wherein a server key storage unit configured to store the same first key and second key as the vehicle; a server authentication processing unit configured to perform an authentication process with the vehicle authentication processing unit of the vehicle using the first key; a server key transmission/reception unit configured to transmit or receive the third key to or from the vehicle key transmission/reception unit of the vehicle by encryption communication which uses the second key; and a server communication unit configured to perform encryption communication with the vehicle communication unit of the vehicle using the third key.

(2) An embodiment of the present invention provides a communication system that performs communication between a vehicle and a server device, including: the server device; a first arithmetic processing device installed in the vehicle; and a second arithmetic processing device which is a secure element installed in the vehicle, wherein the second arithmetic processing device includes: a second vehicle key storage unit configured to store a first key used for communication between the vehicle and the server device; and a vehicle authentication processing unit configured to perform an authentication process with the server device using the first key, the first arithmetic processing device includes: a first vehicle key storage unit configured to store a second key used for communication between the vehicle and the server device; a vehicle key transmission/reception unit configured to transmit or receive a third key to or from the server device by encryption communication which uses the second key; and a vehicle communication unit configured to perform encryption communication with the server device using the third key, and the server device includes: a server key storage unit configured to store the same first key and second key as those of the vehicle; a server authentication processing unit configured to perform an authentication process with the vehicle authentication processing unit of the vehicle using the first key; a server key transmission/reception unit configured to transmit or receive the third key to or from the vehicle key transmission/reception unit of the vehicle by encryption communication which uses the second key; and a server communication unit configured to perform encryption communication with the vehicle communication unit of the vehicle using the third key.

(3) According to an embodiment of the present invention, in the communication system according to (1) or (2), the second arithmetic processing device further includes: a vehicle master key storage unit configured to store a master key; and a vehicle key generation unit configured to generate the first key and the second key using the master key and a vehicle-corresponding identifier corresponding to the vehicle.

(4) According to an embodiment of the present invention, in the communication system according to any one of (1) to (3), the server device further includes: a server master key storage unit configured to store the same master key as the vehicle; and a server key generation unit configured to generate the first key and the second key using the master key and a vehicle-corresponding identifier corresponding to the vehicle.

(5) According to an embodiment of the present invention, in the communication system according to (3) or (4), the first arithmetic processing device further includes a vehicle-corresponding identifier notification unit configured to notify the second arithmetic processing device and the server device of the vehicle-corresponding identifier.

(6) An embodiment of the present invention provides a vehicle that performs communication with a server device, the vehicle including: a first arithmetic processing device; and a second arithmetic processing device which is a secure element, wherein the second arithmetic processing device includes: a vehicle key storage unit configured to store a first key and a second key used for communication between the vehicle and the server device; a vehicle authentication processing unit configured to perform an authentication process with the server device using the first key; and a vehicle key transmission/reception unit configured to transmit or receive a third key to or from the server device by encryption communication which uses the second key, and wherein the first arithmetic processing device includes a vehicle communication unit configured to perform encryption communication with the server device using the third key.

(7) An embodiment of the present invention provides a vehicle that performs communication with a server device, the vehicle including: a first arithmetic processing device; and a second arithmetic processing device which is a secure element, wherein the second arithmetic processing device includes: a second vehicle key storage unit configured to store a first key used for communication between the vehicle and the server device; and a vehicle authentication processing unit configured to perform an authentication process with the server device using the first key, the first arithmetic processing device includes: a first vehicle key storage unit configured to store a second key used for communication between the vehicle and the server device; a vehicle key transmission/reception unit configured to transmit or receive a third key to or from the server device by encryption communication which uses the second key; and a vehicle communication unit configured to perform encryption communication with the server device using the third key.

(8) An embodiment of the present invention provides a server device that performs communication with a vehicle, the server device including: a server key storage unit configured to store the same first key and second key as the vehicle; a server authentication processing unit configured to perform an authentication process with a vehicle authentication processing unit of a second arithmetic processing device which is a secure element of the vehicle using the first key; a server key transmission/reception unit configured to transmit or receive a third key to or from a vehicle key transmission/reception unit of the vehicle by encryption communication which uses the second key; and a server communication unit configured to perform encryption communication with a vehicle communication unit of the vehicle using the third key.

(9) An embodiment of the present invention provides a communication method between a vehicle and a server device, the vehicle including a first arithmetic processing device and a second arithmetic processing device which is a secure element, the communication method including: storing, by the second arithmetic processing device, a first key and a second key used for communication between the vehicle and the server device; performing, by the second arithmetic processing device, an authentication process with the server device using the first key; transmitting or receiving, by the second arithmetic processing device, a third key to or from the server device by encryption communication which uses the second key; and performing, by the first arithmetic processing device, encryption communication with the server device using the third key.

(10) An embodiment of the present invention provides a communication method between a vehicle and a server device, the vehicle including a first arithmetic processing device and a second arithmetic processing device which is a secure element, the communication method including: storing, by the second arithmetic processing device, a first key used for communication between the vehicle and the server device; performing, by the second arithmetic processing device, an authentication process with the server device using the first key; storing, by the first arithmetic processing device, a second key used for communication between the vehicle and the server device; transmitting or receiving, by the first arithmetic processing device, a third key to or from the server device by encryption communication which uses the second key; and performing, by the first arithmetic processing device, encryption communication with the server device using the third key.

(11) An embodiment of the present invention provides a computer program for causing a second computer which is a secure element and is included in a vehicle that performs communication with a server device to realize processes of: storing a first key and a second key used for communication between the vehicle and the server device; performing an authentication process with the server device using the first key; and transmitting or receiving a third key to or from the server device by encryption communication which uses the second key, wherein the computer program further causes a first computer included in the vehicle to realize a process of performing encryption communication with the server device using the third key.

(12) An embodiment of the present invention provides a computer program for causing a second computer which is a secure element and is included in a vehicle that performs communication with a server device to realize processes of: storing a first key used for communication between the vehicle and the server device; and performing an authentication process with the server device using the first key, wherein the computer program further causes a first computer included in the vehicle to realize processes of: storing a second key used for communication between the vehicle and the server device; transmitting or receiving a third key to or from the server device by encryption communication which uses the second key; and performing encryption communication with the server device using the third key.

(13) An embodiment of the present invention provides a computer program for causing a computer of a server device that performs communication with a vehicle to realize processes of: storing the same first key and second key as the vehicle; performing an authentication process with a vehicle authentication processing unit of a second arithmetic processing device which is a secure element of the vehicle using the first key; transmitting or receiving a third key to or from a vehicle key transmission/reception unit of the vehicle by encryption communication which uses the second key; and performing encryption communication with a vehicle communication unit of the vehicle using the third key.

Advantageous Effects of Invention

According to the present invention, an advantage is obtained whereby security can be improved when a vehicle such as an automobile performs communication with an external server device.

DESCRIPTION OF EMBODIMENTS

Hereinafter, an embodiment of the present invention will be described with reference to the drawings. In the embodiment illustrated below, an automobile is described as an example of a vehicle.

Figure 1:
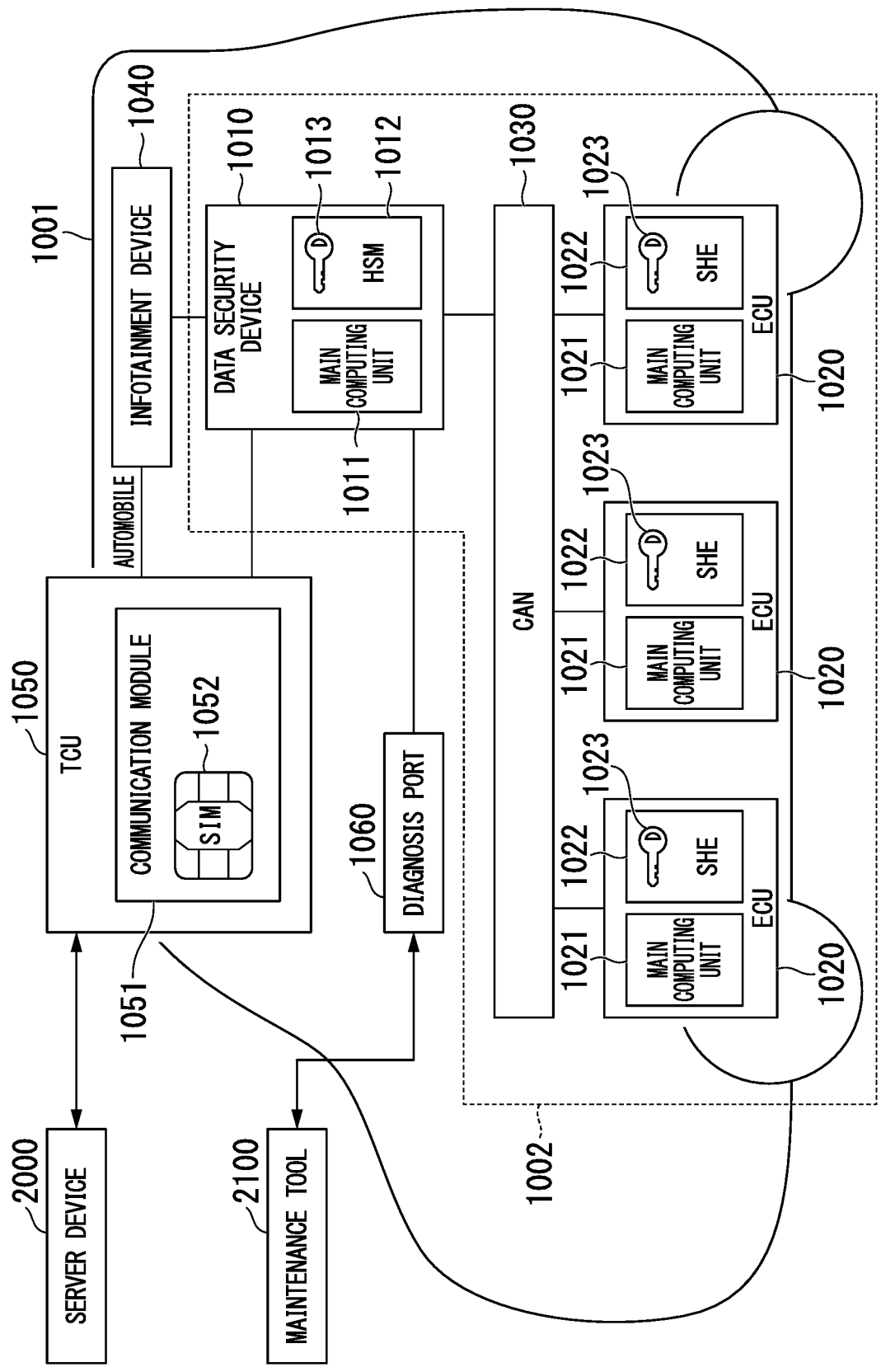
FIG. 1 is a diagram illustrating a configuration example of an automobile 1001 and a communication system according to an embodiment.

FIG. 1 is a diagram illustrating a configuration example of an automobile 1001 and a communication system according to the present embodiment.

In FIG. 1, an automobile 1001 includes a data security device 1010, a plurality of electronic control units (ECUs) 1020, an infotainment device 1040, and a telecommunication unit (TCU) 1050. The ECUs 1020 are in-vehicle computers provided in the automobile 1001. The ECUs 1020 have control functions such as engine control of the automobile 1001. Examples of the ECUs 1020 include an ECU having an engine control function, an ECU having a handle control function, and an ECU having a brake control function. The data security device 1010 has a function of providing data security to be applied to the ECUs 1020 installed in the automobile 1001. Any one of the ECUs installed in the automobile 1001 may function as the data security device 1010.

The data security device 1010 and the plurality of ECUs 1020 are connected to a controller area network (CAN) 1030 provided in the automobile 1001. The CAN 1030 is a communication network. CANs are known as a type of communication network installed in an automobile. The data security device 1010 exchanges data with respective ECUs 1020 via the CAN 1030. The ECUs 1020 exchange data with the other ECUs 1020 via the CAN 1030.

A communication network other than the CAN may be provided in the automobile 1001 as a communication network installed in a vehicle, and data exchange between the data security device 1010 and the ECUs 1020 and data exchange between respective ECUs 1020 may be performed via the communication network other than the CAN. For example, a local interconnect network (LW) may be provided in the automobile 1001. Moreover, both a CAN and the LW may be provided in the automobile 1001. The automobile 1001 may include an ECU 1020 connected to the LIN. The data security device 1010 may be connected to the CAN and the LW. The data security device 1010 may exchange data with the ECU 1020 connected to the CAN via the CAN and may exchange data with the ECU 1020 connected to the LIN via the LIN. Moreover, respective ECUs 1020 may exchange data via the LIN.

An in-vehicle computer system 1002 provided in the automobile 1001 is formed by the data security device 1010 and the plurality of ECUs 1020 connected to the CAN 1030. In the present embodiment, the in-vehicle computer system 1002 functions as an in-vehicle control system of the automobile 1001.

The data security device 1010 monitors communication between an internal device and an external device of the in-vehicle computer system 1002. The data security device 1010 is connected to the infotainment device 1040, the TCU 1050, and a diagnostics port 1060 as examples of an external device of the in-vehicle computer system 1002. The ECUs 1020 perform communication with an external device of the in-vehicle computer system 1002 via the data security device 1010.

As a configuration of the CAN 1030, the CAN 1030 may include a plurality of buses (communication lines) and the plurality of buses may be connected to the data security device 1010. In this case, one ECU 1020 or a plurality of ECUs 1020 are connected to one bus.

The automobile 1001 includes the diagnostics port 1060. An on-board diagnostics (OBD) port, for example, may be used as the diagnostics port 1060. An external device of the automobile 1001 can be connected to the diagnostics port 1060. An example of an external device of the automobile 1001 that can be connected to the diagnostics port 1060 is a maintenance tool 2100 or the like illustrated in FIG. 1. The data security device 1010 and a device (for example, the maintenance tool 2100) connected to the diagnostics port 1060 exchange data via the diagnostics port 1060. The maintenance tool 2100 may have the functions of a conventional diagnostics terminal connected to an OBD port.

The automobile 1001 includes the infotainment device 1040. A device having a navigation function, a position information service function, a multimedia (music and video) play function, an audio communication function, a data communication function, an Internet connection function, and the like is an example of the infotainment device 1040. The infotainment device 1040 is generally referred to as an in-vehicle infotainment (IVI) system.

The automobile 1001 includes the TCU 1050. The TCU 1050 is a communication device. The TCU 1050 includes a communication module 1051. The communication module 1051 performs radio communication using a radio communication network. The communication module 1051 includes a subscriber identity module (SIM) 1052. The SIM 1052 is a SIM in which information for using a radio communication network is written. The communication module 1051 can connect to the radio communication network using the SIM 1052 to perform radio communication.

An embedded subscriber identity module (eSIM) may be used as the SIM 1052. A SIM and an eSIM are examples of secure elements (SEs). A SIM and an eSIM are tamper-resistant.

The infotainment device 1040 and the TCU 1050 exchange data. For example, the infotainment device 1040 and the TCU 1050 may be connected by a communication cable and the infotainment device 1040 and the TCU 1050 may transmit and receive data via the communication cable. A Universal Serial Bus (USB), for example, may be used as a communication scheme between the infotainment device 1040 and the TCU 1050. Alternatively, the infotainment device 1040 and the TCU 1050 may be connected by a CAN.

The data security device 1010 exchanges data with the TCU 1050. For example, the data security device 1010 and the TCU 1050 may be connected by a communication cable, and the data security device 1010 and the TCU 1050 may transmit and receive data via the communication cable. For example, the data security device 1010 and the TCU 1050 may be connected by a CAN. Alternatively, a USB, for example, may be used as a communication scheme between the data security device 1010 and the TCU 1050.

The data security device 1010 may exchange data with the TCU 1050 via the infotainment device 1040. Alternatively, the TCU 1050 may be connected to the diagnostics port 1060, and the data security device 1010 may exchange data with the TCU 1050 connected to the diagnostics port 1060 via the diagnostics port 1060. Alternatively, the data security device 1010 may include the communication module 1051 including the SIM 1052. When the data security device 1010 includes the communication module 1051 including the SIM 1052, the automobile 1001 may not include the TCU 1050.

Alternatively, the infotainment device 1040 may include the communication module 1051 including the SIM 1052. When the infotainment device 1040 includes the communication module 1051 including the SIM 1052, the automobile 1001 may not include the TCU 1050. When the infotainment device 1040 includes the communication module 1051 including the SIM 1052, the data security device 1010 may exchange data with the communication module 1051 included in the infotainment device 1040.

The data security device 1010 includes a main computing unit 1011 and a hardware security module (HSM) 1012. The main computing unit 1011 executes a computer program for realizing the functions of the data security device 1010. The HSM 1012 has a cryptographic processing function and the like. The HSM 1012 is tamper-resistant. The HSM 1012 is an example of a secure element. The HSM 1012 includes a storage unit 1013 that stores data. The main computing unit 1011 uses the HSM 1012.

The ECUs 1020 include the main computing unit 1021 and a secure hardware extension (SHE) 1022. The main computing unit 1021 executes a computer program for realizing the functions of the ECUs 1020. The SHE 1022 has a cryptographic processing function and the like. The SHE 1022 is tamper-resistant. The SHE 1022 is an example of a secure element. The SHE 1022 includes a storage unit 1023 that stores data. The main computing unit 1021 uses the SHE 1022. An SHE is disclosed in Non-Patent Literature 3, for example.

Although the HSM is used in the data security device 1010 in the present embodiment, a SHE may be used in the data security device 1010 instead of the HSM.

The server device 2000 transmits and receives data to and from the communication module 1051 of the TCU 1050 of the automobile 1001 via a communication circuit. The server device 2000 transmits and receives data to and from the communication module 1051 of the TCU 1050 of the automobile 1001 via a radio communication network used by the communication module 1051. Alternatively, the server device 2000 may transmit and receive data to and from the communication module 1051 via a communication network such as the Internet and the radio communication network. Moreover, for example, the server device 2000 and the communication module 1051 may be connected by a dedicated circuit such as a virtual private network (VPN) circuit and data may be transmitted and received via the dedicated circuit. For example, a dedicated circuit such as a VPN circuit may be provided by a radio communication network corresponding to the SIM 1052.

The server device 2000 performs communication with the TCU 1050 of the automobile 1001 and transmits and receives data to and from the data security device 1010 and the infotainment device 1040 of the automobile 1001 via the TCU 1050.

When the data security device 1010 includes the communication module 1051 including the SIM 1052, the server device 2000 may perform communication with the communication module 1051 of the data security device 1010. Moreover, when the infotainment device 1040 includes the communication module 1051 including the SIM 1052, the server device 2000 may perform communication with the communication module 1051 of the infotainment device 1040.

The server device 2000 and the automobile 1001 may be connected by a communication cable. For example, the server device 2000 and the data security device 1010 of the automobile 1001 may be connected by a communication cable. Alternatively, the server device 2000 and the automobile 1001 may be configured to perform communication via a cable or wireless communication network. For example, the server device 2000 and the automobile 1001 may be connected by a cable or wireless local area network (LAN).

Figure 2:
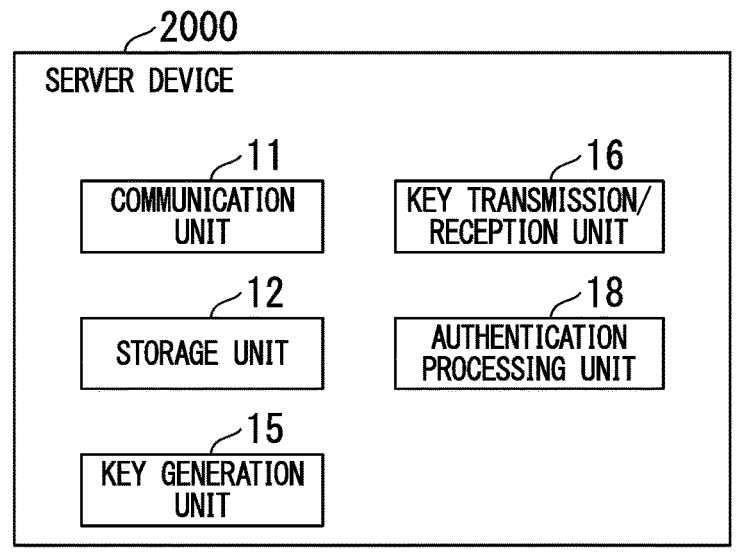
FIG. 2 is a diagram illustrating a configuration example of a server device 2000 according to an embodiment.

FIG. 2 is a diagram illustrating a configuration example of the server device 2000 according to the present embodiment. In FIG. 2, the server device 2000 includes a communication unit 11, a storage unit 12, a key generation unit 15, a key transmission/reception unit 16, and an authentication processing unit 18. The communication unit 11 performs communication with other devices via a communication circuit. The storage unit 12 stores data. The key generation unit 15 generates keys. The key transmission/reception unit 16 transmits or receives keys to or from the automobile 1001. The authentication processing unit 18 performs an authentication process with the automobile 1001.

The functions of the server device 2000 are realized when a central processing unit (CPU) included in the server device 2000 executes a computer program. The server device 2000 may be configured using a general-purpose computer device or may be configured as a dedicated hardware device.

Figure 3:
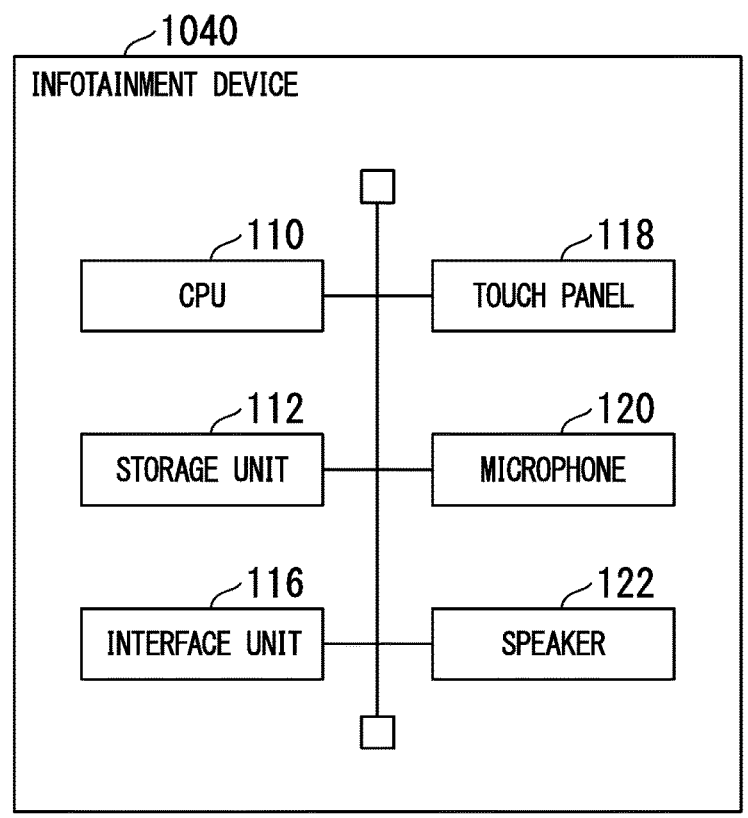
FIG. 3 is a block diagram illustrating a hardware configuration example of an infotainment device 1040 according to an embodiment.

FIG. 3 is a block diagram illustrating a hardware configuration example of the infotainment device 1040 according to the present embodiment. In FIG. 3, the infotainment device 1040 includes a CPU 110, a storage unit 112, an interface unit 116, a touch panel 118, a microphone 120, and a speaker 122. These respective units are configured to be able to exchange data.

The CPU 110 performs control of the infotainment device 1040. This control function is realized when the CPU 110 executes a computer program. The storage unit 112 stores various pieces of data and a computer program executed by the CPU 110. The storage unit 112 stores a computer program for realizing various functions of the infotainment device 1040. Various functions of the infotainment device 1040 are realized when the CPU 110 executes the computer program.

The interface unit 116 transmits and receives data to and from an external device of the subject infotainment device 1040. The interface unit 116 includes an interface that transmits and receives data to and from the TCU 1050 and an interface that transmits and receives data to and from the data security device 1010. The touch panel 118 includes a display screen such as a liquid crystal panel, displays data on the display screen, and receives data corresponding to a user's touch operation on the display screen. The microphone 120 receives audio. The speaker 122 reproduces audio.

Figure 4:
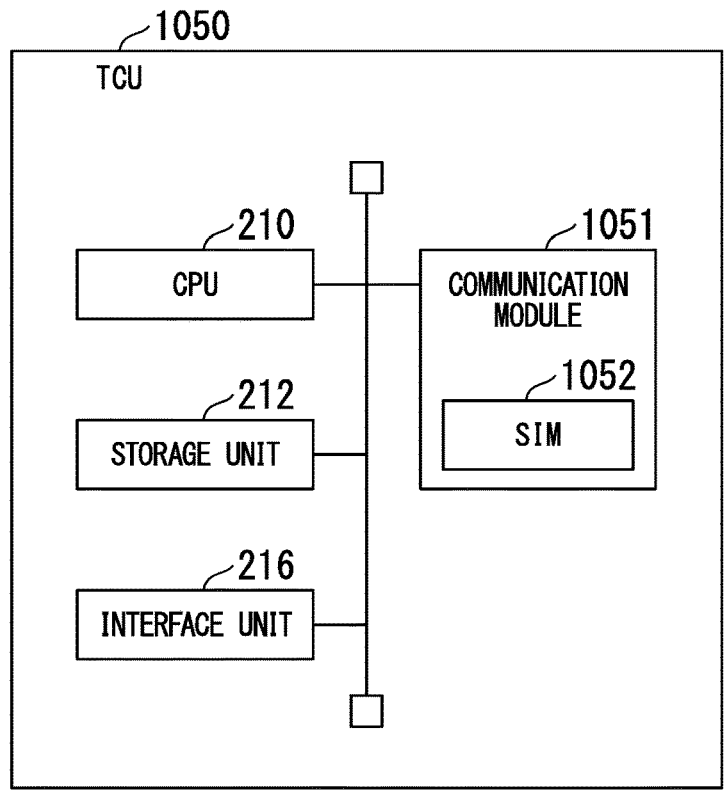
FIG. 4 is a block diagram illustrating a hardware configuration example of a TCU 1050 according to an embodiment.

FIG. 4 is a block diagram illustrating a hardware configuration example of the TCU 1050 according to the present embodiment. In FIG. 4, the TCU 1050 includes a CPU 210, a storage unit 212, an interface unit 216, and the communication module 1051. These respective units are configured to be able to exchange data. The communication module 1051 includes the SIM 1052.

The CPU 210 performs control of the TCU 1050. This control function is realized when the CPU 210 executes a computer program. The storage unit 212 stores various pieces of data and a computer program executed by the CPU 210. The storage unit 212 stores a computer program for realizing various functions of the TCU 1050. Various functions of the TCU 1050 are realized when the CPU 210 executes the computer program.

The interface unit 216 transmits and receives data to and from an external device of the subject TCU 1050. The interface unit 216 includes an interface that transmits and receives data to and from the infotainment device 1040 and an interface that transmits and receives data to and from the data security device 1010. The communication module 1051 and the SIM 1052 are as described above.

Figure 5:
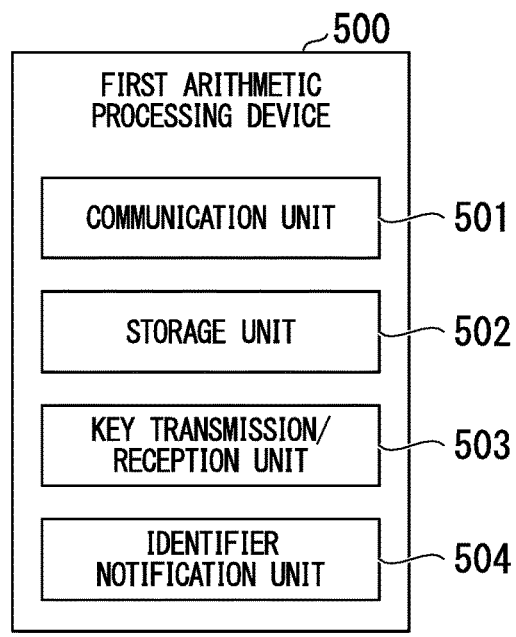
FIG. 5 is a diagram illustrating a functional configuration example of a first arithmetic processing device 500 according to an embodiment.

FIG. 5 is a diagram illustrating a functional configuration example of the first arithmetic processing device 500 according to the present embodiment. In FIG. 5, the first arithmetic processing device 500 includes a communication unit 501, a storage unit 502, a key transmission/reception unit 503, and an identifier notification unit 504. The communication unit 501 performs communication with an external device of the first arithmetic processing device 500. The storage unit 502 stores data. The key transmission/reception unit 503 transmits or receives keys to or from the server device 2000. The identifier notification unit 504 notifies of a vehicle corresponding identifier.

In the present embodiment, the infotainment device 1040 of the automobile 1001 may include the function of the first arithmetic processing device 500. Alternatively, the TCU 1050 of the automobile 1001 may include the function of the first arithmetic processing device 500. Alternatively, the data security device 1010 of the automobile 1001 may include the function of the first arithmetic processing device 500.

Figure 6:
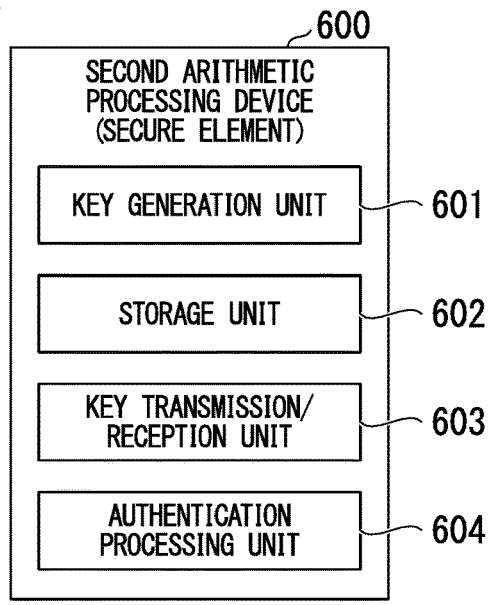
FIG. 6 is a diagram illustrating a functional configuration example of a second arithmetic processing device 600 according to an embodiment.

FIG. 6 is a diagram illustrating a functional configuration example of the second arithmetic processing device 600 according to the present embodiment. In FIG. 6, the second arithmetic processing device 600 includes a key generation unit 601, a storage unit 602, a key transmission/reception unit 603, and an authentication processing unit 604. The key generation unit 601 generates keys. The storage unit 602 stores data. The key transmission/reception unit 603 transmits or receives keys to or from the server device 2000. The authentication processing unit 604 performs an authentication process with the server device 2000.

The second arithmetic processing device 600 is a secure element. The second arithmetic processing device 600 may be a tamper-resistant semiconductor product. For example, the second arithmetic processing device 600 may be configured using a SIM, an eSIM, a HSM, a SHE, or an integrated circuit (IC) chip.

In the present embodiment, the SIM 1052 of the communication module 1051 of the TCU 1050 of the automobile 1001 may include the function of the second arithmetic processing device 600. The SIM 1052 is a secure element. The SIM 1052 is tamper-resistant. Alternatively, the HSM 1012 of the data security device 1010 of the automobile 1001 may include the function of the second arithmetic processing device 600. The HSM 1012 is a secure element. The HSM 1012 is tamper-resistant. Alternatively, a tamper-resistant IC chip which is a secure element may be provided in the infotainment device 1040 of the automobile 1001, and the IC chip may have the function of the second arithmetic processing device 600.

[Configuration Examples of First and Second Arithmetic Processing Devices]

Configuration examples of the first and second arithmetic processing devices according to the present embodiment will be described.

(Configuration Example 1 of First and Second Arithmetic Processing Devices)

In Configuration Example 1 of the first and second arithmetic processing devices, the infotainment device 1040 as an example of the first arithmetic processing device 500 has the function of the first arithmetic processing device 500, and the SIM 1052 of the communication module 1051 of the TCU 1050 as an example of the second arithmetic processing device 600 has the function of the second arithmetic processing device 600. The function of the first arithmetic processing device 500 is realized when the CPU 110 of the infotainment device 1040 executes a computer program for realizing the function of the first arithmetic processing device 500. The function of the second arithmetic processing device 600 is realized when the SIM 1052 of the communication module 1051 of the TCU 1050 executes a computer program for realizing the function of the second arithmetic processing device 600.

Communication between the first arithmetic processing device 500 (the infotainment device 1040) and the second arithmetic processing device 600 (the SIM 1052) is realized when the interface unit 116 of the infotainment device 1040 and the interface unit 216 of the TCU 1050 transmit and receive data. The first arithmetic processing device 500 (the infotainment device 1040) performs communication with the server device 2000 via the TCU 1050 as an example according to the present embodiment.

(Configuration Example 2 of First and Second Arithmetic Processing Devices)

In Configuration Example 2 of the first and second arithmetic processing devices, the data security device 1010 as an example of the first arithmetic processing device 500 has the function of the first arithmetic processing device 500, and the SIM 1052 of the communication module 1051 of the TCU 1050 as an example of the second arithmetic processing device 600 has the function of the second arithmetic processing device 600. The function of the first arithmetic processing device 500 is realized when the main computing unit 1011 of the data security device 1010 executes a computer program for realizing the function of the first arithmetic processing device 500. The function of the second arithmetic processing device 600 is realized when the SIM 1052 of the communication module 1051 of the TCU 1050 executes a computer program for realizing the function of the second arithmetic processing device 600.

Communication between the first arithmetic processing device 500 (the data security device 1010) and the second arithmetic processing device 600 (the SIM 1052) is realized when the interface unit (not illustrated) of the data security device 1010 and the interface unit 216 of the TCU 1050 transmit and receive data. The interface unit of the data security device 1010 transmits and receives data to and from an external device of the subject data security device 1010. The interface unit of the data security device 1010 includes an interface that transmits and receives data via the CAN 1030, an interface that transmits and receives data to and from the infotainment device 1040, an interface that transmits and receives data to and from the TCU 1050, and an interface that transmits and receives data via the diagnostics port 1060. The main computing unit 1011 transmits and receives data to and from another device other than the data security device 1010 via the interface unit. The first arithmetic processing device 500 (the data security device 1010) performs communication with the server device 2000 via the TCU 1050 as an example according to the present embodiment.

(Configuration Example 3 of First and Second Arithmetic Processing Devices)

In Configuration Example 3 of the first and second arithmetic processing devices, the data security device 1010 as an example of the first arithmetic processing device 500 has the function of the first arithmetic processing device 500, and the HSM 1012 of the data security device 1010 as an example of the second arithmetic processing device 600 has the function of the second arithmetic processing device 600. The function of the first arithmetic processing device 500 is realized when the main computing unit 1011 of the data security device 1010 executes a computer program for realizing the function of the first arithmetic processing device 500. The function of the second arithmetic processing device 600 is realized when the HSM 1012 of the data security device 1010 executes a computer program for realizing the function of the second arithmetic processing device 600.

Communication between the first arithmetic processing device 500 (the data security device 1010) and the second arithmetic processing device 600 (the HSM 1012) is realized when the main computing unit 1011 and the HSM 1012 transmit and receive data. The first arithmetic processing device 500 (the data security device 1010) performs communication with the server device 2000 via the TCU 1050 as an example according to the present embodiment.

(Configuration Example 4 of First and Second Arithmetic Processing Devices)

Figure 7:
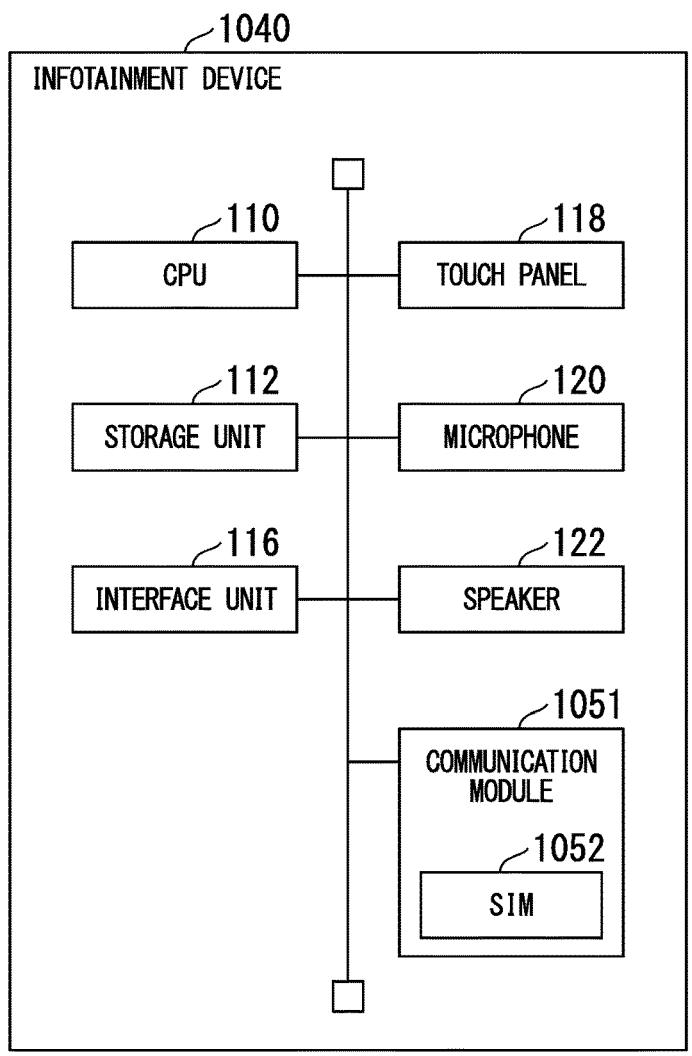
FIG. 7 is a block diagram illustrating another hardware configuration example of the infotainment device 1040 according to an embodiment.

FIG. 7 is a block diagram illustrating another hardware configuration example of the infotainment device 1040 according to the present embodiment. In FIG. 7, portions corresponding to the respective portions illustrated in FIG. 3 are denoted by the same reference numerals. The infotainment device 1040 illustrated in FIG. 7 further includes the communication module 1051 in the configuration illustrated in FIG. 3. The communication module 1051 includes the SIM 1052.

The communication module 1051 can connect to a radio communication network corresponding to the SIM 1052 using the SIM 1052 to perform radio communication. An eSIM may be used as the SIM 1052. The SIM and the eSIM are examples of a secure element. The SIM and the eSIM are tamper-resistant.

The infotainment device 1040 illustrated in FIG. 7 performs communication with an external device of the automobile 1001 using the own communication module 1051. For example, the infotainment device 1040 illustrated in FIG. 7 may perform communication with the server device 2000 using the own communication module 1051.

In Configuration Example 4 of the first and second arithmetic processing devices, the infotainment device 1040 illustrated in FIG. 7 is applied to the first and second arithmetic processing devices. The infotainment device 1040 as an example of the first arithmetic processing device 500 has the function of the first arithmetic processing device 500, the SIM 1052 of the communication module 1051 of the infotainment device 1040 as an example of the second arithmetic processing device 600 has the function of the second arithmetic processing device 600. The function of the first arithmetic processing device 500 is realized when the CPU 110 of the infotainment device 1040 executes a computer program for realizing the function of the first arithmetic processing device 500. The function of the second arithmetic processing device 600 is realized when the SIM 1052 of the communication module 1051 of the infotainment device 1040 executes a computer program for realizing the function of the second arithmetic processing device 600.

Communication between the first arithmetic processing device 500 (the infotainment device 1040) and the second arithmetic processing device 600 (the SIM 1052 of the communication module 1051 of the infotainment device 1040) is realized when the CPU 110 of the infotainment device 1040 and the communication module 1051 of the infotainment device 1040 transmit and receive data. The first arithmetic processing device 500 (the infotainment device 1040) performs communication with the server device 2000 via the communication module 1051 of the infotainment device 1040 as an example according to the present embodiment. The first arithmetic processing device 500 (the infotainment device 1040) may perform communication with the server device 2000 via the TCU 1050 as an example according to the present embodiment. Moreover, when the infotainment device 1040 includes the communication module 1051 including the SIM 1052, the automobile 1001 may not include the TCU 1050.

(Configuration Example 5 of First and Second Arithmetic Processing Devices)

In Configuration Example 5 of the first and second arithmetic processing devices, the TCU 1050 as an example of the first arithmetic processing device 500 has the function of the first arithmetic processing device 500, and the SIM 1052 of the communication module 1051 of the TCU 1050 as an example of the second arithmetic processing device 600 has the function of the second arithmetic processing device 600. The function of the first arithmetic processing device 500 is realized when the CPU 210 of the TCU 1050 executes a computer program for realizing the function of the first arithmetic processing device 500. The function of the second arithmetic processing device 600 is realized when the SIM 1052 of the communication module 1051 of the TCU 1050 executes a computer program for realizing the function of the second arithmetic processing device 600.

Communication between the first arithmetic processing device 500 (the TCU 1050) and the second arithmetic processing device 600 (the SIM 1052) is realized when the CPU 210 and the communication module 1051 transmit and receive data. The first arithmetic processing device 500 (the TCU 1050) performs communication with the server device 2000 with the aid of the communication module 1051 as an example according to the present embodiment.

[Configuration Examples of Vehicle Corresponding Identifier]

Configuration examples of the vehicle corresponding identifier according to the present embodiment will be described. The vehicle corresponding identifier is an identifier corresponding to the automobile 1001.

(Configuration Example 1 of Vehicle Corresponding Identifier)

In Configuration Example 1 of the vehicle corresponding identifier, the vehicle corresponding identifier is configured using a vehicle identification number (VIN) of the automobile 1001. The vehicle corresponding identifier may be a vehicle identification number and may be information made up of the vehicle identification number and other information. The vehicle identification number (VIN) is disclosed in Non-Patent Literature 2, for example.

(Configuration Example 2 of Vehicle Corresponding Identifier)

In Configuration Example 2 of the vehicle corresponding identifier, the vehicle corresponding identifier is configured using an international mobile subscriber identity (IMSI) or an integrated circuit card ID (ICCID) stored in the SIM 1052 installed in the automobile 1001. The vehicle corresponding identifier may be IMSI and may be information made up of the IMSI and other information. Alternatively, the vehicle corresponding identifier may be ICCID and may be information made up of the ICCID and other information. For example, the vehicle corresponding identifier may be information including a plurality of pieces of information among the IMSI, the ICCID, and the vehicle identification number.

(Configuration Example 3 of Vehicle Corresponding Identifier)

In Configuration Example 3 of the vehicle corresponding identifier, the vehicle corresponding identifier is configured using identification information (in-vehicle device identification information) of a device (an in-vehicle device) installed in the automobile 1001. The in-vehicle device identification information of an in-vehicle device such as the identification information of the communication module 1051, the identification information of the TCU 1050, the identification information of the infotainment device 1040, and the identification information of the data security device 1010 can be used as the in-vehicle device identification information used for the vehicle corresponding identifier. Moreover, the vehicle corresponding identifier may be configured using one or a plurality of pieces of in-vehicle device identification information among the respective pieces of in-vehicle device identification information of the in-vehicle device. The vehicle corresponding identifier may be the in-vehicle device identification information and may be information made up of information other than the in-vehicle device identification information. For example, the vehicle corresponding identifier may be information including the in-vehicle device identification information and one or a plurality of pieces of information among the IMSI, the ICCID, and the vehicle identification number.

[Examples of Key Generation Method]

Examples of a key generation method according to the present embodiment will be described. In the present embodiment, a MAC key K_mac_gen and an ENC key K_enc_gen are generated as examples of keys. The MAC key K_mac_gen is a key used for an authentication process. The ENC key K_enc_gen is a key used for encryption communication when transmitting or receiving keys. In the present embodiment, the MAC key K_mac_gen corresponds to a first key and the ENC key K_enc_gen corresponds to a second key.

In the present embodiment, a common key is generated using a predetermined key generation function. An example of a key generation function will be described below.

(Example 1 of Key Generation Function)

Common Key=Digest (Master_Secret, V_ID, Key_ID (Nk))

Here, Master_Secret is a master key. V_ID is a vehicle corresponding identifier. Key_ID (Nk) is a key type identifier. Nk is a variable indicating the type of a key. The digest (Master_Secret, V_ID, Key_ID (Nk)) is a digest value generated on the basis of the master key Master_Secret, the vehicle corresponding identifier V_ID, and the key type identifier Key_ID (Nk). A value calculated by a hash function or a value calculated by an exclusive logical addition operation may be used as the digest value, for example. For example, a common key is a hash function value calculated using the master key Master_Secret, the vehicle corresponding identifier V_ID, and the key type identifier Key_ID (Nk) as an input value.

The digest values are different if the key type identifiers Key_ID (Nk) have different values. By changing the value of the key type identifier Key_ID (Nk), a different common key can be generated on the basis of the same master key Master_Secret and the same vehicle corresponding identifier V_ID. For example, a key type identifier of a MAC key is defined as Key_ID (mac) and a key type identifier of an ENC key is defined as Key_ID (enc). In this case, using the master key Master_Secret, the vehicle corresponding identifier V_ID, and the key type identifiers Key_ID (mac) and Key_ID (enc), the MAC key K_mac_gen and the ENC key K_enc_gen can be generated as different keys as follows.

MAC key K_mac_gen=Digest (Master_Secret, V_ID, Key_ID (mac))

ENC key K_enc_gen=Digest (Master_Secret, V_ID, Key_ID (enc))

(Example 2 of Key Generation Function)

In Example 2 of the key generation function, a cipher-based message authentication code (CMAC) is generated as a common key.

Common key=CMAC (Master_Secret: V_ID, Key_ID (Nk))

In CMAC (A;B), a key "A" is a key used for generating CMAC and data "B" is generation target data of CMAC. Therefore, in Example 2 of the key generation function, the common key is "CMAC of data "B"" generated using the key "A". In CMAC (Master_Secret: V_ID, Key_ID (Nk)), the master key Master_Secret is a key (key "A") used for generating CMAC, and the connected data of the vehicle corresponding identifier V_ID and the key type identifier Key_ID (Nk) is the generation target data (data "B") of CMAC. Therefore, in Example 2 of the key generation function, the common key is "CMAC of the connected data of vehicle corresponding identifier V_ID and key type identifier Key_ID (Nk)" generated using the master key Master_Secret.

In Example 2 of the key generation function, CMACs are different if the values of key type identifiers Key_ID (Nk) are different. Therefore, in Example 2 of the key generation function, similarly to Example 1 of the key generation function, by changing the value of the key type identifier Key_ID (Nk), a different common key can be generated on the basis of the same master key Master_Secret and the same vehicle corresponding identifier V_ID.

[Examples of Communication Method]

Next, Examples of a communication method according to the present embodiment will be described. In the following description of the example of the communication method, a vehicle identification number is used as an example of the vehicle corresponding identifier. The vehicle corresponding identifier of the automobile 1001 is a vehicle identification number VIN of the automobile 1001.

An encryption communication path may be used as a communication path between the server device 2000 and the first arithmetic processing device 500. For example, the server device 2000 and the first arithmetic processing device 500 may perform hypertext transfer protocol secure (https) communication as an example of the encryption communication path. Moreover, the server device 2000 and the first arithmetic processing device 500 may perform communication using a dedicated circuit such as a VPN circuit.

(Example 1 of Communication Method)

Figure 8:
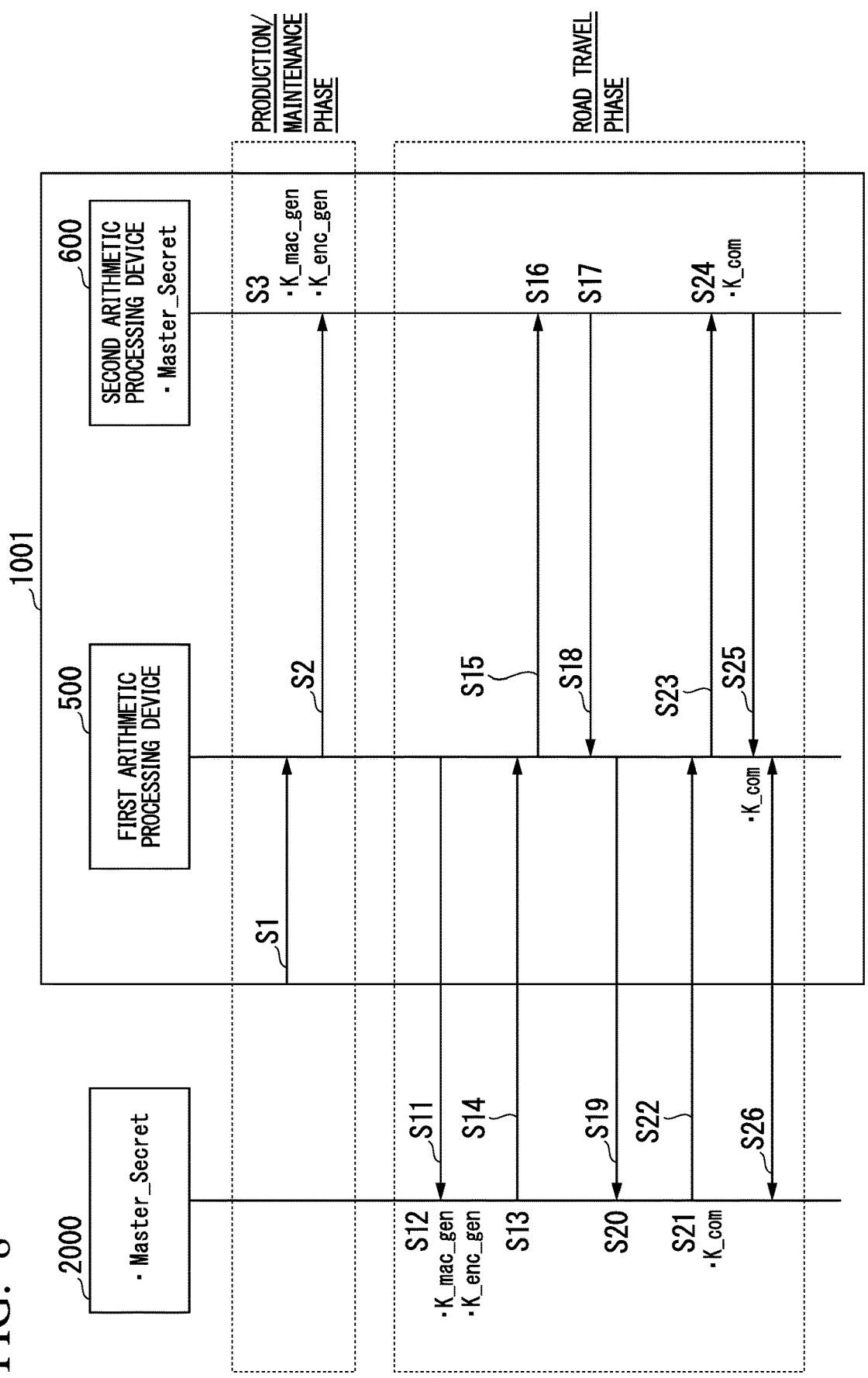
FIG. 8 is a sequence chart illustrating Example 1 of a communication method according to an embodiment.

Example 1 of a communication method according to the present embodiment will be described with reference to FIG. 8. FIG. 8 is a sequence chart illustrating Example 1 of a communication method according to the present embodiment.

In FIG. 8, the server device 2000 stores the master key Master_Secret in advance in the storage unit 12. The second arithmetic processing device 600 stores the master key Master_Secret in advance in the storage unit 602. The master key Master_Secret that the server device 2000 stores in the storage unit 12 is the same as the master key Master_Secret that the second arithmetic processing device 600 stores in the storage unit 602. The storage unit 12 corresponds to a server master key storage unit. The storage unit 602 corresponds to a vehicle master key storage unit.

The master key Master_Secret is stored in the SIM 1052 as an example of the second arithmetic processing device 600 at a manufacturing plant or the like of the SIM 1052, for example. Alternatively, the master key Master_Secret may be stored in the SIM 1052 at a manufacturing plant or the like of the automobile 1001, the communication module 1051, or the TCU 1050.

Example 1 of the communication method includes a phase (a production/maintenance phase) of production or maintenance of the automobile 1001 and a phase (a road travel phase) of ordinary travel of the automobile 1001.

(Production/Maintenance Phase)

A production/maintenance phase of Example 1 of the communication method will be described. The production/maintenance phase is executed during production of the automobile 1001 in an automobile manufacturing company or during maintenance of the automobile 1001 in an automobile maintenance facility or an automobile retailer shop.

(Step S1)

The first arithmetic processing device 500 acquires the vehicle identification number VIN of the automobile 1001. The vehicle identification number VIN of the automobile 1001 may be stored in advance in the first arithmetic processing device 500, and the vehicle identification number VIN may be notified to the first arithmetic processing device 500 from an external device when a predetermined trigger occurs.

For example, when the ECU 1020 having a function of controlling the engine of the automobile 1001 stores the vehicle identification number YIN of the automobile 1001, the vehicle identification number VIN of the automobile 1001 may be notified from the ECU 1020 to the first arithmetic processing device 500 after the ECU 1020 is activated.

Alternatively, the vehicle identification number VIN of the automobile 1001 may be notified in such a way that the vehicle identification number VIN managed by the automobile manufacturing company, the automobile retailer shop, or the like of the automobile 1001, for example, is supplied to the first arithmetic processing device 500. For example, the automobile manufacturing company of the automobile 1001 may have a database of the vehicle identification number VIN, and the vehicle identification number VIN may be notified to the first arithmetic processing device 500 of the automobile 1001 by communication from the database.

(Step S2)

The identifier notification unit 504 of the first arithmetic processing device 500 notifies the second arithmetic processing device 600 of the vehicle identification number VIN of the automobile 1001.

(Step S3)

The key generation unit 601 of the second arithmetic processing device 600 generates the MAC key K_mac_gen and the ENC key K_enc_gen using the master key Master_Secret stored in the storage unit 602, the vehicle identification number VIN of the automobile 1001 notified from the first arithmetic processing device 500, the key type identifiers Key_ID (mac) and Key_ID (enc). The above-described example of the key generation method is applied to this key generation method. The key generation function is set in advance in the key generation unit 601. The key type identifier Key_ID (mac) and Key_ID (enc) are set in advance in the key generation unit 601. The key generation unit 601 corresponds to a vehicle key generation unit.

The key generation unit 601 generates the MAC key K_mac_gen and the ENC key K_enc_gen using Example 1 of the key generation function "Common key=Digest (Master_Secret, V_ID, Key_ID (Nk))" as an example of the key generation function as follows.

MAC key K_mac_gen=Digest (Master_Secret, VIN, Key_ID (mac))

ENC key K_enc_gen=Digest (Master_Secret, VIN, Key_ID (enc))

Here, the vehicle corresponding identifier V_ID is the vehicle identification number VIN of the automobile 1001. Moreover, the digest value is a value calculated by a hash function as an example.

The storage unit 602 stores the MAC key K_mac_gen and the ENC key K_enc_gen. In Example 1 of the communication method, the storage unit 602 corresponds to a vehicle key storage unit.

The second arithmetic processing device 600 may remove the master key Master_Secret from the storage unit 602 after generating the MAC key K_mac_gen and the ENC key K_enc_gen. In this way, the possibility of leakage of the master key Master_Secret can be reduced.

Hereinabove, the production/maintenance phase of Example 1 of the communication method has been described.

(Road Travel Phase)

The road travel phase of Example 1 of the communication method will be described. The road travel phase is executed in a phase of ordinary travel of the automobile 1001, for example, during engine activation of the automobile 1001 or at the start of communication between the automobile 1001 and the server device 2000.

(Step S11)

The first arithmetic processing device 500 transmits a challenge (random number c) and the vehicle identification number VIN of the automobile 1001 to the server device 2000. The first arithmetic processing device 500 generates a random number c and uses the random number c as the challenge. The first arithmetic processing device 500 stores the challenge (random number c).

(Step S12)

The key generation unit 15 of the server device 2000 generates the MAC key K_mac_gen and the ENC key K_enc_gen using the master key Master_Secret stored in the storage unit 12, the vehicle identification number VIN of the automobile 1001 received from the first arithmetic processing device 500, and the key type identifiers Key_ID (mac) and Key_ID (enc). The key generation method is the same as the key generation method of the key generation unit 601 of the second arithmetic processing device 600 in step S3. The key generation function is set in advance in the key generation unit 15. The key type identifiers Key_ID (mac) and Key_ID (enc) are set in advance in the key generation unit 15. The key generation unit 15 corresponds to a server key generation unit.

The storage unit 12 stores the MAC key K_mac_gen and the ENC key K_enc_gen in correlation with the vehicle identification number VIN of the automobile 1001. The storage unit 12 corresponds to a server key storage unit.

(Step S13)

The authentication processing unit 18 of the server device 2000 generates a response K_mac_gen (random number c) using the MAC key K_mac_gen stored in the storage unit 12 and the challenge (random number c) received from the first arithmetic processing device 500. This response generation method is set in advance in the authentication processing unit 18. The response K_mac_gen (random number c) is encryption data obtained by encrypting the random number c with the MAC key K_mac_gen as an example according to the present embodiment.

The response K_mac_gen (random number c) may be CMAC (K_mac_gen: random number c) (that is, "CMAC of random number c" generated using the MAC key K_mac_gen) as an example according to the present embodiment.

(Step S14)

The authentication processing unit 18 of the server device 2000 transmits a challenge (random number s) and the response K_mac_gen (random number c) to the first arithmetic processing device 500 of the automobile 1001. The authentication processing unit 18 generates the random number s and uses the random number s as the challenge. The authentication processing unit 18 stores the challenge (random number s).

(Step S15)

The first arithmetic processing device 500 transmits the challenge (random number c) transmitted to the server device 2000 and the challenge (random number s) and the response K_mac_gen (random number c) received from the server device 2000 to the second arithmetic processing device 600.

(Step S16)

The authentication processing unit 604 of the second arithmetic processing device 600 verifies the response K_mac_gen (random number c) received from the first arithmetic processing device 500. As a response verification method, a method corresponding to the response generation method in the authentication processing unit 18 of the server device 2000 is set in advance in the authentication processing unit 604. In verification of the response K_mac_gen (random number c), the authentication processing unit 604 uses the challenge (random number c) received from the first arithmetic processing device 500 and the MAC key K_mac_gen stored in the storage unit 602.

For example, when the response K_mac_gen (random number c) is encryption data of the random number c encrypted by the MAC key K_mac_gen, the authentication processing unit 604 encrypts the challenge (random number c) received from the first arithmetic processing device 500 with the MAC key K_mac_gen stored in the storage unit 602 and compares the encryption data generated by encryption with the response K_mac_gen (random number c). When the comparison result shows that both are identical, the verification of the response K_mac_gen (random number c) succeeds. When both are not identical, the verification of the response K_mac_gen (random number c) fails.

As another verification method when the response K_mac_gen (random number c) is encryption data of the random number c encrypted with the MAC key K_mac_gen, the authentication processing unit 604 may decrypt the response K_mac_gen (random number c) received from the first arithmetic processing device 500 with the MAC key K_mac_gen stored in the storage unit 602 and may compare the decryption result with the challenge (random number c) received from the first arithmetic processing device 500. When the comparison result shows that both are identical, the verification of the response K_mac_gen (random number c) succeeds. When both are not identical, the verification of the response K_mac_gen (random number c) fails.

For example, when the response K_mac_gen (random number c) is CMAC (K_mac_gen; random number c), the authentication processing unit 604 generates CMAC of the challenge (random number c) received from the first arithmetic processing device 500 using the MAC key K_mac_gen stored in the storage unit 602 and compares the generated CMAC with the response K_mac_gen (random number c). When the comparison result shows that both are identical, the verification of the response K_mac_gen (random number c) succeeds. When both are not identical, the verification of the response K_mac_gen (random number c) fails.

When the verification of the response K_mac_gen (random number c) succeeds, the flow proceeds to step S17. On the other hand, when the verification of the response K_mac_gen (random number c) fails, the process of FIG. 8 ends. When the verification of the response K_mac_gen (random number c) fails, the second arithmetic processing device 600 may execute predetermined error processing.

(Step S17)

The authentication processing unit 604 of the second arithmetic processing device 600 generates the response K_mac_gen (random number s) using the MAC key K_mac_gen stored in the storage unit 602 and the challenge (random number s) received from the first arithmetic processing device 500. This response generation method is set in advance in the authentication processing unit 604. The response K_mac_gen (random number s) is encryption data obtained by encrypting the random number s with the MAC key K_mac_gen as an example according to the present embodiment.

The response K_mac_gen (random number s) may be CMAC (K_mac_gen; random number s) (that is, "CMAC of random number s" generated using the MAC key K_mac_gen) as an example according to the present embodiment.

(Step S18)

The authentication processing unit 604 of the second arithmetic processing device 600 transmits the response K_mac_gen (random number s) to the first arithmetic processing device 500.

(Step S19)

The first arithmetic processing device 500 transmits the response K_mac_gen (random number s) received from the second arithmetic processing device 600 to the server device 2000.

(Step S20)

The authentication processing unit 18 of the server device 2000 verifies the response K_mac_gen (random number s) received from the first arithmetic processing device 500 of the automobile 1001. As a response verification method, a method corresponding to the response generation method in the authentication processing unit 604 of the second arithmetic processing device 600 of the automobile 1001 is set in advance in the authentication processing unit 18. In verification of the response K_mac_gen (random number s), the authentication processing unit 18 uses the challenge (random number s) transmitted to the first arithmetic processing device 500 of the automobile 1001 and the MAC key K_mac_gen stored in the storage unit 12.

For example, when the response K_mac_gen (random number s) is encryption data of the random number s encrypted using the MAC key K_mac_gen, the authentication processing unit 18 performs verification as follows. That is, the authentication processing unit 18 encrypts the challenge (random number s) transmitted to the first arithmetic processing device 500 of the automobile 1001 with the MAC key K_mac_gen stored in the storage unit 12 and compares the response K_mac_gen (random number s) with the encryption data generated by the encryption. When the comparison result shows that both are identical, the verification of the response K_mac_gen (random number s) succeeds. When both are not identical, the verification of the response K_mac_gen (random number s) fails.

As another verification method when the response K_mac_gen (random number s) is the encryption data of the random number s encrypted by the MAC key K_mac_gen, the authentication processing unit 18 performs verification as follows. That is, the authentication processing unit 18 may decrypt the response K_mac_gen (random number s) received from the first arithmetic processing device 500 of the automobile 1001 with the MAC key K_mac_gen stored in the storage unit 12 and compare the challenge (random number s) transmitted to the first arithmetic processing device 500 with the decryption result. When the comparison result shows that both are identical, the verification of the response K_mac_gen (random number s) succeeds. When both are not identical, the verification of the response K_mac_gen (random number s) fails.

For example, when the response K_mac_gen (random number s) is CMAC (K_mac_gen; random number s), the authentication processing unit 18 performs verification as follows. That is, the authentication processing unit 18 generates CMAC of the challenge (random number s) transmitted to the first arithmetic processing device 500 of the automobile 1001 using the MAC key K_mac_gen stored in the storage unit 12 and compares the response K_mac_gen (random number s) with the generated CMAC. When the comparison result shows that both are identical, the verification of the response K_mac_gen (random number s) succeeds. When both are not identical, the verification of the response K_mac_gen (random number s) fails.

When the verification of the response K_mac_gen (random number s) succeeds, the flow proceeds to step S21. On the other hand, when the verification of the response K_mac_gen (random number s) fails, the process of FIG. 8 ends. When the verification of the response K_mac_gen (random number s) fails, the server device 2000 may execute predetermined error processing.

The authentication processing unit 18 of the server device 2000 corresponds to a server authentication processing unit. The authentication processing unit 604 of the second arithmetic processing device 600 of the automobile 1001 corresponds to a vehicle authentication processing unit.

(Step S21)

The key transmission/reception unit 16 of the server device 2000 generates a session key K_com. For example, the key transmission/reception unit 16 may generate a random number and generate the session key K_com on the basis of the random number. The storage unit 12 stores the session key K_com in correlation with the vehicle identification number VIN of the automobile 1001. The session key K_com corresponds to a third key.

(Step S22)

The key transmission/reception unit 16 of the server device 2000 encrypts the session key K_com with the ENC key K_enc_gen stored in the storage unit 12 and generates an encryption session key K_enc_gen (K_com). The key transmission/reception unit 16 transmits the encryption session key K_enc_gen (K_com) to the first arithmetic processing device 500 of the automobile 1001.

(Step S23)

The first arithmetic processing device 500 transmits the encryption session key K_enc_gen (K_com) received from the server device 2000 to the second arithmetic processing device 600.

(Step S24)

The key transmission/reception unit 603 of the second arithmetic processing device 600 decrypts the encryption session key K_enc_gen (K_com) received from the first arithmetic processing device 500 with the ENC key K_enc_gen stored in the storage unit 602. As a result of the decryption, the session key K_com is acquired. In this way, the server device 2000 and the automobile 1001 store the same session key K_com.

(Step S25)

The key transmission/reception unit 603 of the second arithmetic processing device 600 transmits the session key K_com to the first arithmetic processing device 500. The storage unit 502 of the first arithmetic processing device 500 stores the session key K_com received from the second arithmetic processing device 600.

In Example 1 of the communication method, the key transmission/reception unit 603 of the second arithmetic processing device 600 of the automobile 1001 corresponds to a vehicle key transmission/reception unit. The key transmission/reception unit 16 of the server device 2000 corresponds to a server key transmission/reception unit.

(Step S26)

The communication unit 11 of the server device 2000 and the communication unit 501 of the first arithmetic processing device 500 of the automobile 1001 perform encryption communication using the session key K_com. In the encryption communication, the encryption data K_com (data) whose data is encrypted with the session key K_com is transmitted and received between the communication unit 11 of the server device 2000 and the communication unit 501 of the first arithmetic processing device 500 of the automobile 1001. In this way, an encryption communication path which uses the session key K_com is established between the communication unit 11 of the server device 2000 and the communication unit 501 of the first arithmetic processing device 500 of the automobile 1001.

The communication unit 11 of the server device 2000 corresponds to a server communication unit. The communication unit 501 of the first arithmetic processing device 500 of the automobile 1001 corresponds to a vehicle communication unit.

The key transmission/reception unit 603 of the second arithmetic processing device 600 of the automobile 1001 may generate the session key K_com and supply the same to the server device 2000.

Hereinabove, the road travel phase of Example 1 of the communication method has been described.

According to Example 1 of the communication method, the server device 2000 and the second arithmetic processing device 600 of the automobile 1001 performs an authentication process using the MAC key K_mac_gen (the first key) and transmits and receives the session key K_com (the third key) by encryption communication which uses the ENC key K_enc_gen (the second key). In this way, the security of the session key K_com (the third key) used for the encryption communication between the server device 2000 and the first arithmetic processing device 500 of the automobile 1001 is improved. This provides an advantage whereby the security when the automobile 1001 and the external server device 2000 perform communication is improved.

The MAC key K_mac_gen (the first key) used for the authentication process between the server device 2000 and the automobile 1001 is stored in the second arithmetic processing device 600 which is a secure element of the automobile 1001. In this way, it is possible to improve the reliability of authentication between the server device 2000 and the automobile 1001.

(Example 2 of Communication Method)

Figure 9:
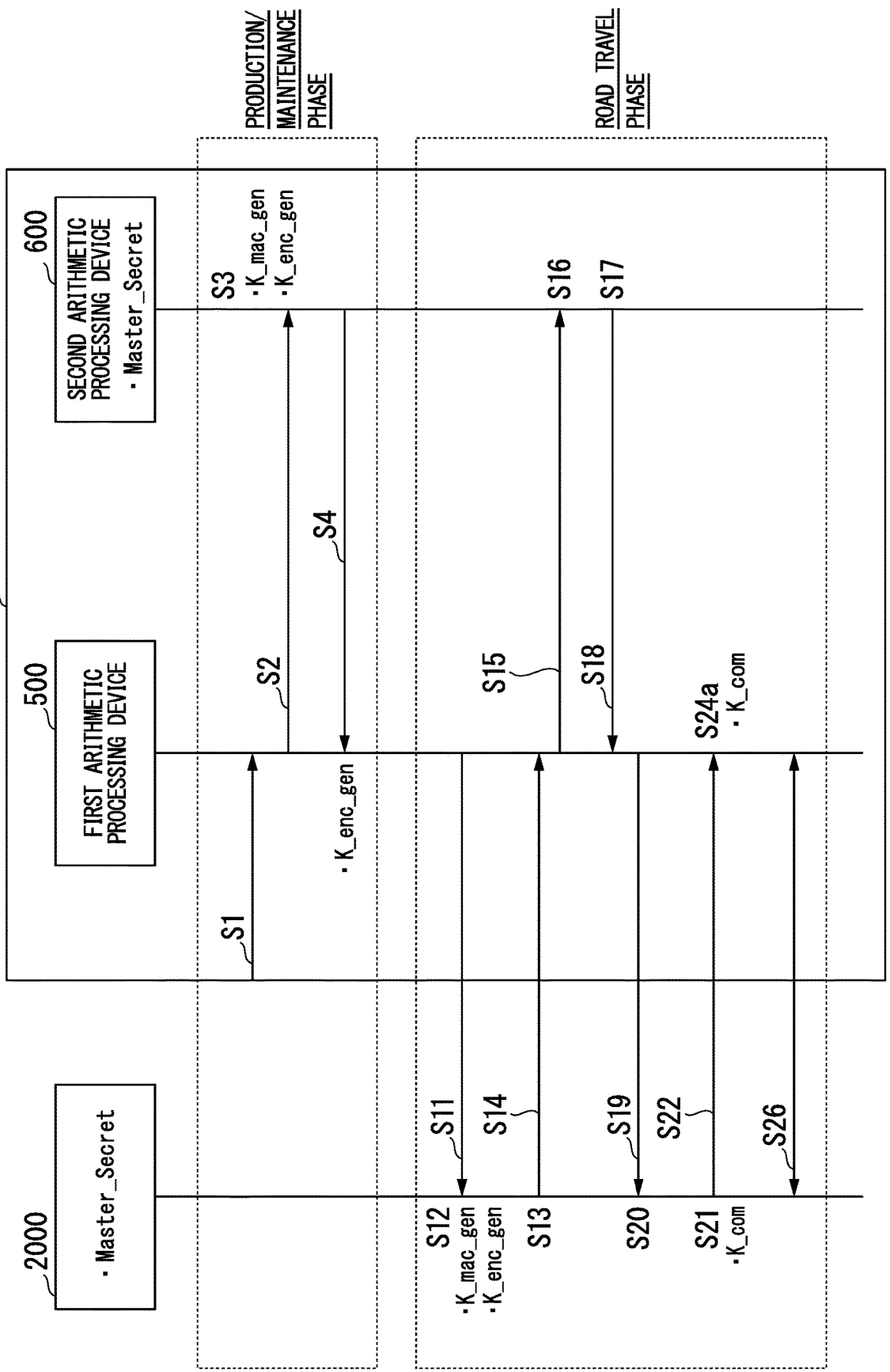
FIG. 9 is a sequence chart illustrating Example 2 of a communication method according to an embodiment.

Example 2 of the communication method according to the present embodiment will be described with reference to FIG. 9. FIG. 9 is a sequence chart illustrating Example 2 of the communication method according to the present embodiment. In FIG. 9, portions corresponding to the respective steps of FIG. 8 are denoted by the same reference numerals.

In FIG. 9, the server device 2000 stores the master key Master_Secret in advance in the storage unit 12. The second arithmetic processing device 600 stores the master key Master_Secret in advance in the storage unit 602. The master key Master_Secret that the server device 2000 stores in the storage unit 12 is the same as the master key Master_Secret that the second arithmetic processing device 600 stores in the storage unit 602. The storage unit 12 corresponds to a server master key storage unit. In Example 2 of the communication method, the storage unit 602 corresponds to a vehicle master key storage unit and a second vehicle key storage unit.

The master key Master_Secret is stored in the SIM 1052 as an example of the second arithmetic processing device 600 at a manufacturing plant of the SIM 1052, for example. Alternatively, the master key Master_Secret may be stored in the SIM 1052 at a manufacturing plant or the like of the automobile 1001, the communication module 1051, or the TCU 1050.

Example 2 of the communication method includes a production/maintenance phase and a road travel phase similarly to Example 1 of the communication method.

(Production/Maintenance Phase)

A production/maintenance phase of Example 2 of the communication method will be described. In the production/maintenance phase of Example 2 of the communication method, steps S1, S2, and S3 are executed. Steps S1, S2, and S3 are the same as those of Example 1 of the communication method. Subsequently, step S4 is executed.

(Step S4)

The second arithmetic processing device 600 transmits the ENC key K_enc_gen to the first arithmetic processing device 500. The storage unit 502 of the first arithmetic processing device 500 stores the ENC key K_enc_gen received from the second arithmetic processing device 600. In Example 2 of the communication method, the storage unit 502 corresponds to the first vehicle key storage unit.

Hereinabove, the production/maintenance phase of Example 2 of the communication method has been described.

(Road Travel Phase)

The road travel phase of Example 2 of the communication method will be described. In the road travel phase of Example 2 of the communication method, steps S11 to S22 are executed. Steps S11 to S22 are the same as those of Example 1 of the communication method.

(Step S24a)

The key transmission/reception unit 503 of the first arithmetic processing device 500 decrypts the encryption session key K_enc_gen (K_com) received from the server device 2000 with the ENC key K_enc_gen stored in the storage unit 502. As a result of the decryption, the session key K_com is acquired. In this way, the server device 2000 and the automobile 1001 store the same session key K_com. The storage unit 502 of the first arithmetic processing device 500 stores the session key K_com.

In Example 2 of the communication method, the key transmission/reception unit 503 of the first arithmetic processing device 500 of the automobile 1001 corresponds to a vehicle key transmission/reception unit. The key transmission/reception unit 16 of the server device 2000 corresponds to a server key transmission/reception unit.

The key transmission/reception unit 503 of the first arithmetic processing device 500 of the automobile 1001 may generate the session key K_com and supply the same to the server device 2000.

Subsequently, step S26 is executed. Step S26 is the same as that of Example 1 of the communication method.

Hereinabove, the road travel phase of Example 2 of the communication method has been described.

According to Example 2 of the communication method, the server device 2000 and the second arithmetic processing device 600 of the automobile 1001 perform an authentication process using the MAC key K_mac_gen (the first key).

The server device 2000 and the first arithmetic processing device 500 of the automobile 1001 transmit and receive the session key K_com (the third key) by encryption communication which uses the ENC key K_enc_gen (the second key). In this way, the security of the session key K_com (the third key) used for the encryption communication between the server device 2000 and the first arithmetic processing device 500 of the automobile 1001 is improved. This provides an advantage whereby the security when the automobile 1001 and the external server device 2000 perform communication is improved.

The MAC key K_mac_gen (the first key) used for the authentication process between the server device 2000 and the automobile 1001 is stored in the second arithmetic processing device 600 which is a secure element of the automobile 1001. In this way, it is possible to improve the reliability of authentication between the server device 2000 and the automobile 1001.

The ENC key K_enc_gen (the second key) used for encryption communication between the server device 2000 and the automobile 1001 is stored in the first arithmetic processing device 500 of the automobile 1001. The first arithmetic processing device 500 which is not limited to a secure element uses a CPU having a relatively high processing performance whereby the communication speed of the encryption communication between the server device 2000 and the automobile 1001 can be improved.

(Example 3 of Communication Method)

Figure 10:
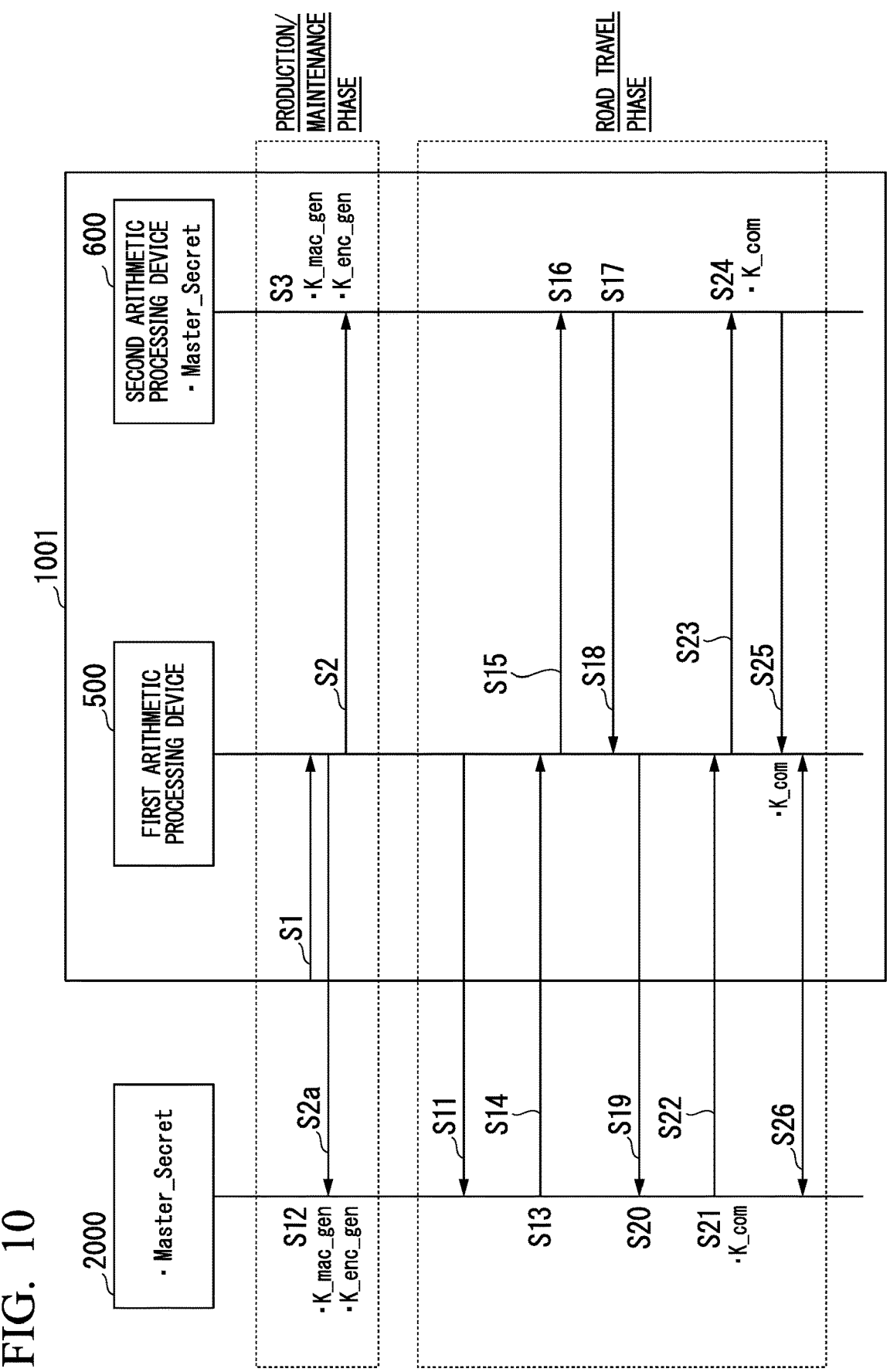
FIG. 10 is a sequence chart illustrating Example 3 of a communication method according to an embodiment.

Example 3 of the communication method according to the present embodiment will be described with reference to FIG. 10. FIG. 10 is a sequence chart illustrating Example 3 of the communication method according to the present embodiment. In FIG. 10, portions corresponding to the respective steps of FIG. 8 are denoted by the same reference numerals.

Example 3 of the communication method includes a production/maintenance phase and a road travel phase similarly to Example 1 of the communication method. In Example 3 of the communication method, the server device 2000 generates a key in the production/maintenance phase. Hereinafter, the differences in comparison with Example 1 of the communication method will be described mainly.

The server device 2000 and the second arithmetic processing device 600 store the same master key Master_Secret in advance similarly to Example 1 of the communication method.

(Production/Maintenance Phase)

A production/maintenance phase of Example 3 of the communication method will be described. In the production/maintenance phase of Example 3 of the communication method, steps S1, S2, and S3 are executed. Steps S1, S2, and S3 are the same as those of Example 1 of the communication method. Subsequently, step S2a is executed.

(Step S2a)

The identifier notification unit 504 of the first arithmetic processing device 500 transmits the vehicle identification number VIN of the automobile 1001 to the server device 2000. In Example 3 of the communication method, the identifier notification unit 504 corresponds to a vehicle-corresponding identifier notification unit.

Subsequently, step S12 is executed. Step S12 is the same as step S12 of the road travel phase of Example 1 of the communication method. The storage unit 12 of the server device 2000 stores the MAC key K_mac_gen and the ENC key K_enc_gen in correlation with the vehicle identification number VIN of the automobile 1001.

Hereinabove, the production/maintenance phase of Example 3 of the communication method has been described.

(Road Travel Phase)

The road travel phase of Example 3 of the communication method will be described. In the road travel phase of Example 3 of the communication method, step S11 and steps S13 to S26 are executed. Step S11 and steps S13 to S26 are the same as those of Example 1 of the communication method.

Similarly to Example 1 of the communication method, the key transmission/reception unit 603 of the second arithmetic processing device 600 of the automobile 1001 may generate the session key K_com and supply the same to the server device 2000.

Hereinabove, the road travel phase of Example 3 of the communication method has been described.

According to Example 3 of the communication method, the server device 2000 and the second arithmetic processing device 600 of the automobile 1001 performs an authentication process using the MAC key K_mac_gen (the first key) and transmits and receives the session key K_com (the third key) by encryption communication which uses the ENC key K_enc_gen (the second key). In this way, the security of the session key K_com (the third key) used for the encryption communication between the server device 2000 and the first arithmetic processing device 500 of the automobile 1001 is improved. This provides an advantage whereby the security when the automobile 1001 and the external server device 2000 perform communication is improved.

According to Example 3 of the communication method, the server device 2000 generates the MAC key K_mac_gen (the first key) and the ENC key K_enc_gen (the second key) in the production/maintenance phase. In this way, it is possible to shorten the processing time of the road travel phase.

The MAC key K_mac_gen (the first key) used for the authentication process between the server device 2000 and the automobile 1001 is stored in the second arithmetic processing device 600 which is a secure element of the automobile 1001. In this way, it is possible to improve the reliability of authentication between the server device 2000 and the automobile 1001.

(Example 4 of Communication Method)

Figure 11:
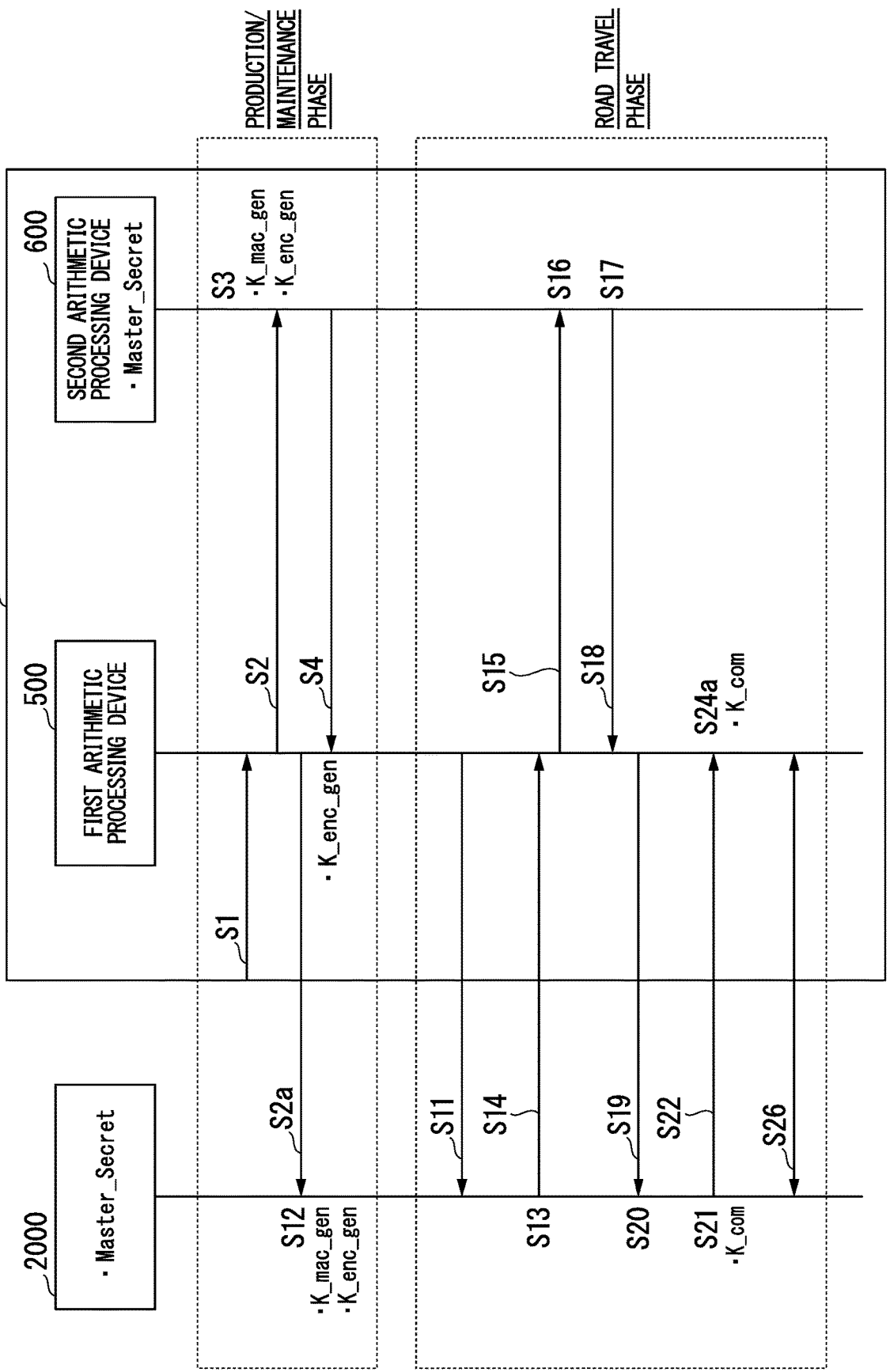
FIG. 11 is a sequence chart illustrating Example 4 of a communication method according to an embodiment.

Example 4 of the communication method according to the present embodiment will be described with reference to FIG. 11. FIG. 11 is a sequence chart illustrating Example 4 of the communication method according to the present embodiment. In FIG. 11, portions corresponding to the respective steps of FIG. 9 are denoted by the same reference numerals.

Example 4 of the communication method includes a production/maintenance phase and a road travel phase similarly to Example 2 of the communication method. In Example 4 of the communication method, the server device 2000 generates a key in the production/maintenance phase similarly to Example 3 of the communication method. Hereinafter, the differences in comparison with Example 2 of the communication method will be described mainly.

The server device 2000 and the second arithmetic processing device 600 store the same master key Master_Secret in advance similarly to Example 2 of the communication method.

(Production/Maintenance Phase)

A production/maintenance phase of Example 4 of the communication method will be described. In the production/maintenance phase of Example 4 of the communication method, steps S1, S2, S3, and S4 are executed. Steps S1, S2, S3, and S4 are the same as those of Example 2 of the communication method. Subsequently, steps S2a and S12 are executed. Steps S2a and S12 are the same as those of Example 3 of the communication method. The storage unit 12 of the server device 2000 stores the MAC key K_mac_gen and the ENC key K_enc_gen in correlation with the vehicle identification number VIN of the automobile 1001.

Hereinabove, the production/maintenance phase of Example 4 of the communication method has been described.

(Road Travel Phase)

The road travel phase of Example 4 of the communication method will be described. In the road travel phase of Example 4 of the communication method, steps S11, S13 to S22, S24a, and S26 are executed. Steps S11, S13 to S22, and S26 are the same as those of Example 1 of the communication method. Step S24a is the same as that of Example 2 of the communication method.

Similarly to Example 2 of the communication method, the key transmission/reception unit 503 of the first arithmetic processing device 500 of the automobile 1001 may generate the session key K_com and supply the same to the server device 2000.

Hereinabove, the road travel phase of Example 4 of the communication method has been described.

According to Example 4 of the communication method, the server device 2000 and the second arithmetic processing device 600 of the automobile 1001 perform an authentication process using the MAC key K_mac_gen (the first key).

The server device 2000 and the first arithmetic processing device 500 of the automobile 1001 transmit and receive the session key K_com (the third key) by encryption communication which uses the ENC key K_enc_gen (the second key). In this way, the security of the session key K_com (the third key) used for the encryption communication between the server device 2000 and the first arithmetic processing device 500 of the automobile 1001 is improved. This provides an advantage whereby the security when the automobile 1001 perform communication with the external server device 2000 is improved.

According to Example 4 of the communication method, the server device 2000 generates the MAC key K_mac_gen (the first key) and the ENC key K_enc_gen (the second key) in the production/maintenance phase. In this way, it is possible to shorten the processing time of the road travel phase.

The MAC key K_mac_gen (the first key) used for the authentication process between the server device 2000 and the automobile 1001 is stored in the second arithmetic processing device 600 which is a secure element of the automobile 1001. In this way, it is possible to improve the reliability of authentication between the server device 2000 and the automobile 1001.

The ENC key K_enc_gen (the second key) used for encryption communication between the server device 2000 and the automobile 1001 is stored in the first arithmetic processing device 500 of the automobile 1001. The first arithmetic processing device 500, which is not limited to a secure element, uses a CPU having a relatively high processing performance whereby the communication speed of the encryption communication between the server device 2000 and the automobile 1001 can be improved.

While the embodiments of the present invention have been described with reference to the drawings, specific configurations are not limited to the embodiments, but may change in design made without departing from the scope of the present invention.

When IMSI or ICCID is used as an example of the vehicle corresponding identifier, if the vehicle corresponding identifier is IMSI, for example, the SIM 1052 may generate the MAC key K_mac_gen and the ENC key K_enc_gen at an arbitrary timing later than a time point at which the IMSI was stored and store the generated MAC key K_mac_gen and ENC key K_enc_gen. For example, IMSI may be written to the SIM 1052 during manufacturing of the SIM 1052, and the SIM 1052 may generate and store the MAC key K_mac_gen and the ENC key K_enc_gen.

When IMSI or ICCID is used as an example of the vehicle corresponding identifier, if the vehicle corresponding identifier is IMSI, for example, the SIM 1052 may notify the first arithmetic processing device 500 of the IMSI thereof. The identifier notification unit 504 of the first arithmetic processing device 500 notifies the server device 2000 of the IMSI notified from the SIM 1052.

When IMSI or ICCID is used as an example of the vehicle corresponding identifier, if the vehicle corresponding identifier is IMSI, for example, and the SIM 1052 is reused by another automobile 1001, the MAC key K_mac_gen and the ENC key K_enc_gen stored in the SIM 1052 may be used by the other automobile 1001.

In the above-described embodiment, although the second arithmetic processing device 600 stores the master key Master_Secret, the second arithmetic processing device 600 may not store the master key Master_Secret. The second arithmetic processing device 600 may stores the MAC key K_mac_gen and the ENC key K_enc_gen generated by an external device without storing the master key Master_Secret. For example, when the SIM 1052 is used as the second arithmetic processing device 600, a manufacturing plant key generation device of the SIM 1052 stores the same master key Master_Secret as that of the server device 2000. The key generation device generates the MAC key K_mac_gen and the ENC key K_enc_gen using the master key Master_Secret and writes the generated MAC key K_mac_gen and ENC key K_enc_gen to the SIM 1052. In this case, the IMSI or the ICCID of the SIM 1052 may be used as the vehicle corresponding identifier.

When the first arithmetic processing device 500 includes a debug port such as a joint test action group (JTAG), the debug port may have an authentication function based on an identifier (ID). In this way, it is possible to suppress leakage of the session key K_com by an attack such as a memory dump or a tapping attack to the first arithmetic processing device 500. For example, the debug port of the infotainment device 1040 or the data security device 1010 may have an authentication function based on ID.

In the above-described embodiment, although HSM or SHE is used in the data security device 1010 or the ECU 1020, a cryptographic processing chip other than HSM or SHE may be used. A cryptographic processing chip called a trusted platform module (TPM) f", for example, may be used in the data security device 1010. The TPMf is tamper-resistant. The TPMf is an example of a secure element. A cryptographic processing chip called "TPMt", for example, may be used in the ECU 1020. The TPMt is tamper-resistant. The TPMt is an example of a secure element.

The above-described embodiment may be applied to an automobile 1001 in an automobile manufacturing company, an automobile maintenance facility, an automobile retailer shop, or the like, for example.

In the above-described embodiment, although an automobile has been described as an example of a vehicle, the embodiment can be also applied to other vehicles other than automobiles such as a motorized bicycle or a railway vehicle.

The computer program for realizing the functions of the respective devices may be recorded on a computer-readable recording medium, and the program recorded on the recording medium may be read by a computer system and be executed by a processor or the like. The "computer system" mentioned herein may include an OS and hardware such as peripheral devices.

The "computer-readable recording medium" refers to a writable nonvolatile memory such as a flexible disk, a magneto-optical disc, a ROM, or a flash memory, a portable medium such as a digital versatile disc (DVD), and a storage device such as a hard disk included in a computer system.

The "computer-readable recording medium" may store a program for a predetermined period like a volatile memory (for example, a dynamic random access memory (DRAM)) inside a computer system which serves as a server or a client when a program is transmitted via a network such as the Internet or a communication circuit such as a telephone circuit.

The program may be transmitted from a computer system that stores the program in a storage device and the like to another computer system via a transmission medium or transmission waves in the transmission medium. Here, the "transmission medium" that transmits the program refers to a medium having a function of transmitting information like a network (a communication network) such as the Internet or a communication circuit (a communication line) such as a telephone circuit.

The program may be a program for realizing some of the above-described functions.

The program may be a so-called differential file (a differential program) capable of realizing the above-described functions in combination with a program recorded in a computer system.

INDUSTRIAL APPLICABILITY

According to the present invention, an advantageous effect is obtained whereby security can be improved when a vehicle such as an automobile performs communication with an external server device.

REFERENCE SIGNS LIST 11, 501: Communication unit
12, 112, 212, 502, 602: Storage unit
15, 601: Key generation unit
16, 503, 603: Key transmission/reception unit
18, 604: Authentication processing unit
110, 210: CPU
116, 216: Interface unit
118: Touch panel
120: Microphone
122: Speaker
504: Identifier notification unit
1001: Automobile
1002: In-vehicle computer system
1010: Data security device
1011, 1021: Main computing unit
1012: HSM
1013, 1023: Storage unit
1020: ECU
1022: SHE
1030: CAN
1040: Infotainment device
1050: TCU
1051: Communication module
1052: SIM
1060: Diagnosis port
2000: Server device
2100: Maintenance tool

The invention claimed is:

1. A communication system that performs communication between a vehicle and a server device, comprising:
the server device;
a first arithmetic processing device installed in the vehicle; and
a second arithmetic processing device which is a secure element installed in the vehicle,
wherein the second arithmetic processing device includes:
a vehicle key storage unit configured to store a first key and a second key used for communication between the vehicle and the server device;
a vehicle authentication processing unit configured to perform an authentication process with the server device using the first key; and
a vehicle key transmission/reception unit configured to transmit or receive a third key to or from the server device by encryption communication which uses the second key,
wherein the first arithmetic processing device includes a vehicle communication unit configured to perform encryption communication with the server device using the third key,
wherein the server device includes:
a server key storage unit configured to store the same first key and second key as the vehicle;
a server authentication processing unit configured to perform an authentication process with the vehicle authentication processing unit of the vehicle using the first key;
a server key transmission/reception unit configured to transmit or receive the third key to or from the vehicle key transmission/reception unit of the vehicle by encryption communication which uses the second key; and
a server communication unit configured to perform encryption communication with the vehicle communication unit of the vehicle using the third key, and
wherein the first arithmetic processing device is a device that is different from the second arithmetic processing device.

2. The communication system according to claim 1, wherein the second arithmetic processing device further includes:
a vehicle master key storage unit configured to store a master key; and
a vehicle key generation unit configured to generate the first key and the second key using the master key and a vehicle-corresponding identifier corresponding to the vehicle.

3. The communication system according to claim 2, wherein the first arithmetic processing device further includes a vehicle-corresponding identifier notification unit configured to notify the second arithmetic processing device and the server device of the vehicle-corresponding identifier.

4. The communication system according to claim 1, wherein the server device further includes:
a server master key storage unit configured to store the same master key as the vehicle; and
a server key generation unit configured to generate the first key and the second key using the master key and a vehicle-corresponding identifier corresponding to the vehicle.

5. A communication system that performs communication between a vehicle and a server device, comprising:
the server device;
a first arithmetic processing device installed in the vehicle; and
a second arithmetic processing device which is a secure element installed in the vehicle,
wherein the second arithmetic processing device includes:
a second vehicle key storage unit configured to store a first key used for communication between the vehicle and the server device; and
a vehicle authentication processing unit configured to perform an authentication process with the server device using the first key,
the first arithmetic processing device includes:
a first vehicle key storage unit configured to store a second key used for communication between the vehicle and the server device;

a vehicle key transmission/reception unit configured to transmit or receive a third key to or from the server device by encryption communication which uses the second key; and a vehicle communication unit configured to perform encryption communication with the server device using the third key, and the server device includes:

a server key storage unit configured to store the same first key and second key as those of the vehicle;

a server authentication processing unit configured to perform an authentication process with the vehicle authentication processing unit of the vehicle using the first key;

a server key transmission/reception unit configured to transmit or receives the third key to or from the vehicle key transmission/reception unit of the vehicle by encryption communication which uses the second key; and a server communication unit configured to perform encryption communication with the vehicle communication unit of the vehicle using the third key, and wherein the first arithmetic processing device is a device that is different from the second arithmetic processing device.

6. The communication system according to claim 5, wherein the second arithmetic processing device further includes:

a vehicle master key storage unit configured to store a master key; and a vehicle key generation unit configured to generate the first key and the second key using the master key and a vehicle-corresponding identifier corresponding to the vehicle.

7. The communication system according to claim 6, wherein the first arithmetic processing device further includes a vehicle-corresponding identifier notification unit configured to notify the second arithmetic processing device and the server device of the vehicle-corresponding identifier.

8. The communication system according to claim 5, wherein the server device further includes:

a server master key storage unit configured to store the same master key as the vehicle; and a server key generation unit configured to generate the first key and the second key using the master key and a vehicle-corresponding identifier corresponding to the vehicle.

9. A vehicle that performs communication with a server device, the vehicle comprising:

a first arithmetic processing device; and a second arithmetic processing device which is a secure element, wherein the second arithmetic processing device includes:

a vehicle key storage unit configured to store a first key and a second key used for communication between the vehicle and the server device;

a vehicle authentication processing unit configured to perform an authentication process with the server device using the first key; and a vehicle key transmission/reception unit configured to transmit or receive a third key to or from the server device by encryption communication which uses the second key, wherein the first arithmetic processing device includes a vehicle communication unit configured to perform encryption communication with the server device using the third key, and wherein the first arithmetic processing device is a device that is different from the second arithmetic processing device.

10. A vehicle that performs communication with a server device, the vehicle comprising:

a first arithmetic processing device; and a second arithmetic processing device which is a secure element, wherein the second arithmetic processing device includes:

a second vehicle key storage unit configured to store a first key used for communication between the vehicle and the server device; and a vehicle authentication processing unit configured to perform an authentication process with the server device using the first key, the first arithmetic processing device includes:

a first vehicle key storage unit configured to store a second key used for communication between the vehicle and the server device;

a vehicle key transmission/reception unit configured to transmit or receive a third key to or from the server device by encryption communication which uses the second key; and a vehicle communication unit configured to perform encryption communication with the server device using the third key, wherein the first arithmetic processing device is a device that is different from the second arithmetic processing device.

11. A server device that performs communication with a vehicle, the server device comprising:

a memory configured to store the same first key and second key as the vehicle;

a server authentication processing unit configured to perform an authentication process with a vehicle authentication processing unit of a second arithmetic processing device which is a secure element of the vehicle using the first key;

a server key transmission/reception unit configured to transmit or receive a third key to or from a vehicle key transmission/reception unit of the vehicle by encryption communication which uses the second key; and a server communication unit configured to perform encryption communication with a vehicle communication unit provided in a first arithmetic processing device of the vehicle using the third key, wherein the first arithmetic processing device is a device that is different from the second arithmetic processing device, and wherein the server authentication processing unit, the server key transmission/reception unit, and the server communication unit are implemented by: (i) hardware, (ii) computer executable instructions executed by a processor, or (iii) a combination of the hardware and the computer executable instructions executed by the processor.

12. A communication method between a vehicle and a server device, the vehicle including a first arithmetic processing device and a second arithmetic processing device which is a secure element, the communication method comprising:
  storing, by the second arithmetic processing device, a first key and a second key used for communication between the vehicle and the server device;
  performing, by the second arithmetic processing device, an authentication process with the server device using the first key;
  transmitting or receiving, by the second arithmetic processing device, a third key to or from the server device by encryption communication which uses the second key; and
  performing, by the first arithmetic processing device, encryption communication with the server device using the third key,
  wherein the first arithmetic processing device is a device that is different from the second arithmetic processing device.

13. A communication method between a vehicle and a server device, the vehicle including a first arithmetic processing device and a second arithmetic processing device which is a secure element, the communication method comprising:
  storing, by the second arithmetic processing device, a first key used for communication between the vehicle and the server device;
  performing, by the second arithmetic processing device, an authentication process with the server device using the first key;
  storing, by the first arithmetic processing device, a second key used for communication between the vehicle and the server device;
  transmitting or receiving, by the first arithmetic processing device, a third key to or from the server device by encryption communication which uses the second key; and
  performing, by the first arithmetic processing device, encryption communication with the server device using the third key,
  wherein the first arithmetic processing device is a device that is different from the second arithmetic processing device.

14. A non-transitory computer-readable recording medium storing a computer program for causing a first computer which is included in a vehicle and a second computer which is a secure element and is included in the vehicle that performs communication with a server device, the computer program causing the second computer to realize processes of:
  storing a first key and a second key used for communication between the vehicle and the server device;
  performing an authentication process with the server device using the first key; and
  transmitting or receiving a third key to or from the server device by encryption communication which uses the second key,
  wherein the computer program further causes the first computer to realize a process of performing encryption communication with the server device using the third key, and
  wherein the first computer is a computer that is different from the second computer.

15. A non-transitory computer-readable recording medium storing a computer program for causing a first computer which is included in a vehicle and a second computer which is a secure element and is included in the vehicle that performs communication with a server device, the computer program causing the second computer to realize processes of:
  storing a first key used for communication between the vehicle and the server device; and
  performing an authentication process with the server device using the first key,
  wherein the computer program further causes a first computer included in the vehicle to realize processes of:
  storing a second key used for communication between the vehicle and the server device;
  transmitting or receiving a third key to or from the server device by encryption communication which uses the second key; and
  performing encryption communication with the server device using the third key,
  wherein the first computer is a computer that is different from the second computer.

16. A non-transitory computer-readable recording medium storing a computer program for causing a computer of a server device that performs communication with a vehicle to realize processes of:
  storing the same first key and second key as the vehicle;
  performing an authentication process with a vehicle authentication processing unit of a second arithmetic processing device which is a secure element of the vehicle using the first key;
  transmitting or receiving a third key to or from a vehicle key transmission/reception unit of the vehicle by encryption communication which uses the second key; and
  performing encryption communication with a vehicle communication unit provided in a first arithmetic processing device of the vehicle using the third key,
  wherein the first arithmetic processing device is a device that is different from the second arithmetic processing device.

* * * * *

UNITED STATES PATENT AND TRADEMARK OFFICE
CERTIFICATE OF CORRECTION

PATENT NO. : 11,212,080 B2
APPLICATION NO. : 16/315031
DATED : December 28, 2021
INVENTOR(S) : Keisuke Takemori et al.

Page 1 of 1

It is certified that error appears in the above-identified patent and that said Letters Patent is hereby corrected as shown below:

On the Title Page

Page 2, item [56], Line 11 delete "datsd" and insert -- dated --.

In the Claims

Column 29, Line 17 Claim 5, delete "receives" and insert -- receive --.

Signed and Sealed this
Twenty-fourth Day of May, 2022

Katherine Kelly Vidal
*Director of the United States Patent and Trademark Office*